United States Patent [19]
Enoki et al.

[11] Patent Number: 5,873,085
[45] Date of Patent: Feb. 16, 1999

[54] VIRTUAL FILE MANAGEMENT SYSTEM

[75] Inventors: Nobuyuki Enoki; Masaya Miyazaki, both of Osaka, Japan

[73] Assignee: Matsushita Electric Industrial Co. Ltd., Osaka, Japan

[21] Appl. No.: 752,378

[22] Filed: Nov. 20, 1996

[30] Foreign Application Priority Data

Nov. 20, 1995 [JP] Japan .................................. 7-301798
Apr. 19, 1996 [JP] Japan .................................. 8-098775
Sep. 27, 1996 [JP] Japan .................................. 8-255627

[51] Int. Cl.⁶ .................................................. G06F 17/30
[52] U.S. Cl. ............................. 707/10; 707/8; 707/101; 707/205
[58] Field of Search ...................... 707/8, 10, 101, 707/205

[56] References Cited

U.S. PATENT DOCUMENTS

| | | | |
|---|---|---|---|
| 4,769,771 | 9/1988 | Lippmann et al. | 707/8 |
| 5,012,405 | 4/1991 | Nishikado et al. | 707/8 |
| 5,142,674 | 8/1992 | Baker et al. | 707/10 |
| 5,333,315 | 7/1994 | Saether et al. | 707/1 |
| 5,355,453 | 10/1994 | Row et al. | 395/200.49 |
| 5,361,349 | 11/1994 | Sugita et al. | 707/8 |
| 5,412,808 | 5/1995 | Bauer | 707/10 |
| 5,463,772 | 10/1995 | Thompson et al. | 707/101 |
| 5,483,466 | 1/1996 | Kawahara et al. | 364/514 C |
| 5,504,863 | 4/1996 | Yoshida | 395/184.01 |
| 5,548,724 | 8/1996 | Akizawa et al. | 395/200.03 |
| 5,603,019 | 2/1997 | Kish | 707/205 |
| 5,619,716 | 4/1997 | Nonaka et al. | 395/800 |
| 5,630,067 | 5/1997 | Kindell et al. | 395/200.09 |
| 5,706,475 | 1/1998 | Entressangel et al. | 395/500 |

FOREIGN PATENT DOCUMENTS

| | | |
|---|---|---|
| 0518311A | 12/1992 | European Pat. Off. . |
| 5-241934 | 9/1993 | Japan . |
| 6332782A | 12/1994 | Japan . |
| 7-49805 | 2/1995 | Japan . |

OTHER PUBLICATIONS

Anupam Bhide, et al., "A Comparison of Two Approaches to Build Reliable Distributed File Servers," International Conference on Distributed Computing Systems, Arlington, Texas, May 20–24, 1991, No. Conf. 11, May 20, 1991, *Institute of Electrical and Electronics Engineers,* pp. 616–623, XP000221903, p. 617, col. 2—line 26, col. 2, line 41.

*Primary Examiner*—Wayne Amsbury
*Assistant Examiner*—Shahid Alam
*Attorney, Agent, or Firm*—Beveridge, DeGrandi Weilacher & Young L.L.P

[57] ABSTRACT

A virtual file management system constructed with a plurality of servers and a plurality of terminals that share file services provided by said servers, is that a virtual file management apparatus operating in at least one of said plurality of servers is provided that has: a management table which manages files stored on said plurality of servers by using virtual file identifiers, and in which a server name of a server where real data is stored and a real file identifier in said server are stored as a set for each of said virtual file identifiers; a receiving section which receives a file access request from each of said terminals; a request analyzing section which checks said management table by using the virtual file identifier contained in the file access request received by said receiving section, and thereby determines the server where the real data of the requested file is stored; a transmitting section which transmits data; and a request modification processing section which modifies said file access request so that a response to said file access request can be sent back to the terminal that issued said access request, directly from the server determined by said request analyzing section, and which instructs said transmitting section to transmit said modified file access request to said determined server, and said plurality of servers each include a request processing section which receives the file access request transmitted from said transmitting section of said virtual file management apparatus, and processes said received file access request, and which transmits the processed result to said terminal at least when said file access request is a request to read file contents.

24 Claims, 33 Drawing Sheets

Fig. 3

103. MANAGEMENT TABLE

| VIRTUAL FILE ID | SERVER ID | REAL FILE ID |
|---|---|---|
| V_001 | 101a | FILE_A |
| V_002 | 101b | FILE_B |

Fig. 4

| ORIGINATOR | 109a |
|---|---|
| DESTINATION | 101a |
| FILE IDENTIFIER | V_002 |
| COMMAND | Read |

Fig. 5

| ORIGINATOR | 109a |
|---|---|
| DESTINATION | 101b |
| FILE IDENTIFIER | FILE_B |
| COMMAND | Read |

Fig. 8

103. MANAGEMENT TABLE

| VIRTUAL FILE ID | SERVER ID | REAL FILE ID | FILE SIZE |
|---|---|---|---|
| V_001 | 101a | FILE_A | 100 |
| V_002 | 101b | FILE_B | 30 |
| V_003 | 101b | FILE_C | 25 |

Fig. 9

| ORIGINATOR | 109a |
|---|---|
| DESTINATION | 101a |
| FILE IDENTIFIER | V_003 |
| COMMAND | GetFileSize |

Fig. 11

103. MANAGEMENT TABLE

| VIRTUAL FILE ID | SERVER ID | REAL FILE ID |
|---|---|---|
| V_001 | 101a | FILE_A |
| V_002 | 101b | FILE_B |
| V_003 | 101b | FILE_C |

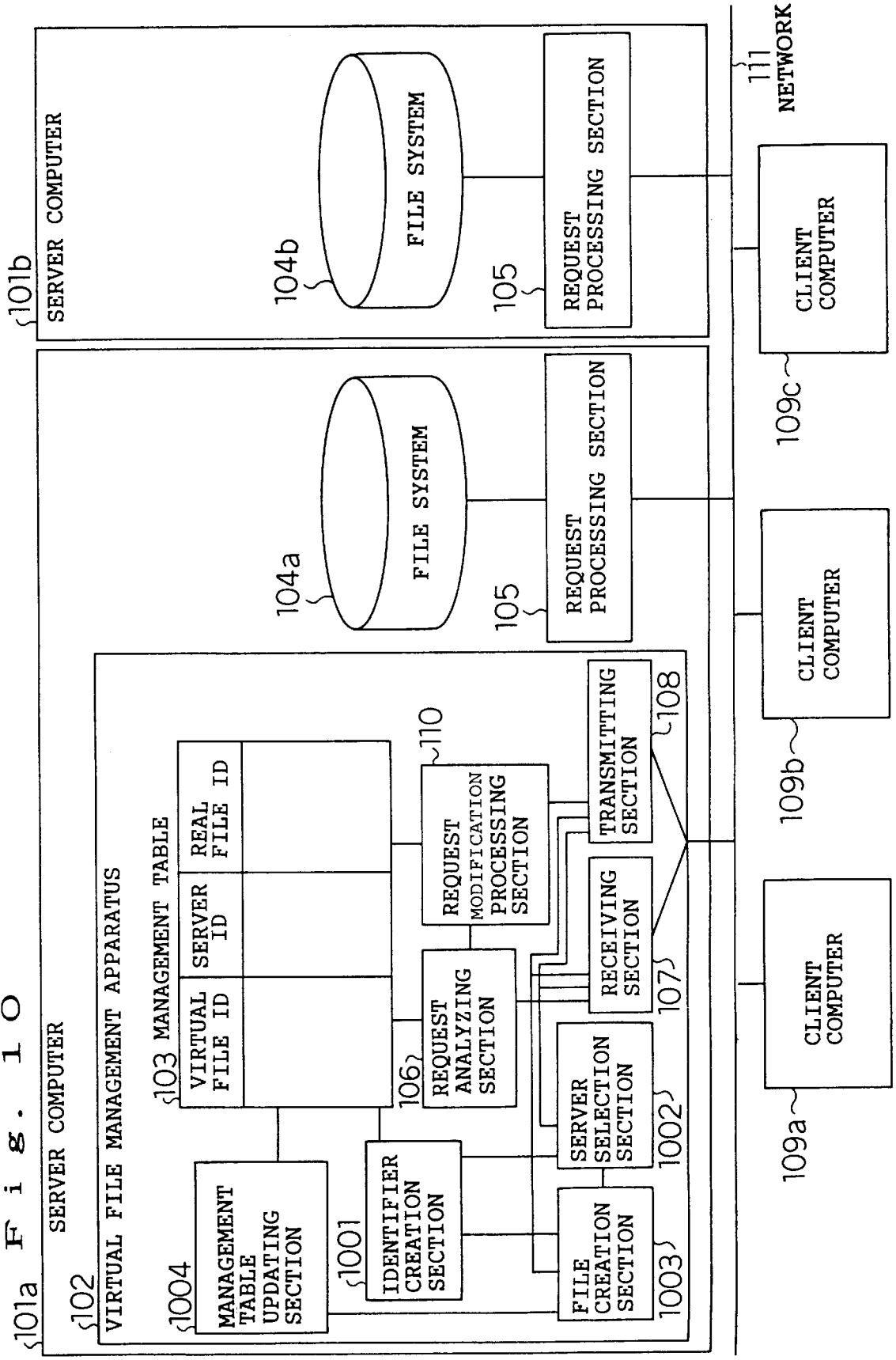

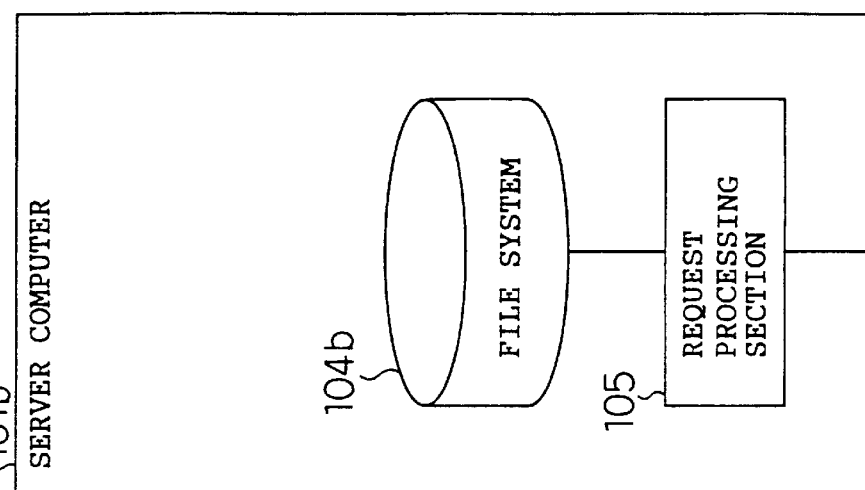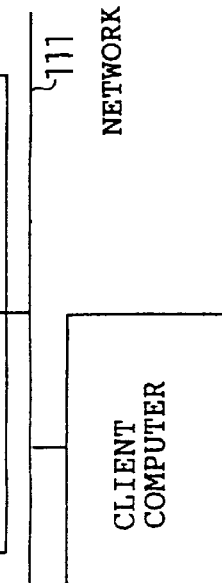

Fig. 15

1201 MANAGEMENT TABLE

| VIRTUAL FILE ID | SERVER ID | REAL FILE ID | ACCESS INHIBIT FLAG |
|---|---|---|---|
| V_001 | 101a | FILE_A | — |
| V_002 | 101b | FILE_B | — |

Fig. 16

1201 MANAGEMENT TABLE

| VIRTUAL FILE ID | SERVER ID | REAL FILE ID | ACCESS INHIBIT FLAG |
|---|---|---|---|
| V_001 | 101a | FILE_A | SET |
| V_002 | 101b | FILE_B | — |

Fig. 17

1201 MANAGEMENT TABLE

| VIRTUAL FILE ID | SERVER ID | REAL FILE ID | ACCESS INHIBIT FLAG |
|---|---|---|---|
| V_001 | 101b | FILE_A2 | SET |
| V_002 | 101b | FILE_B | — |

Fig. 18

1201 MANAGEMENT TABLE

| VIRTUAL FILE ID | SERVER ID | REAL FILE ID | ACCESS INHIBIT FLAG |
|---|---|---|---|
| V_001 | 101b | FILE_A2 | — |
| V_002 | 101b | FILE_B | — |

Fig. 20

1901. OPERATING CONDITION MANAGEMENT TABLE

| SERVER ID | OPERATING CONDITION |
|---|---|
| 101a | OPERATING |
| 101b | NOT OPERATING |

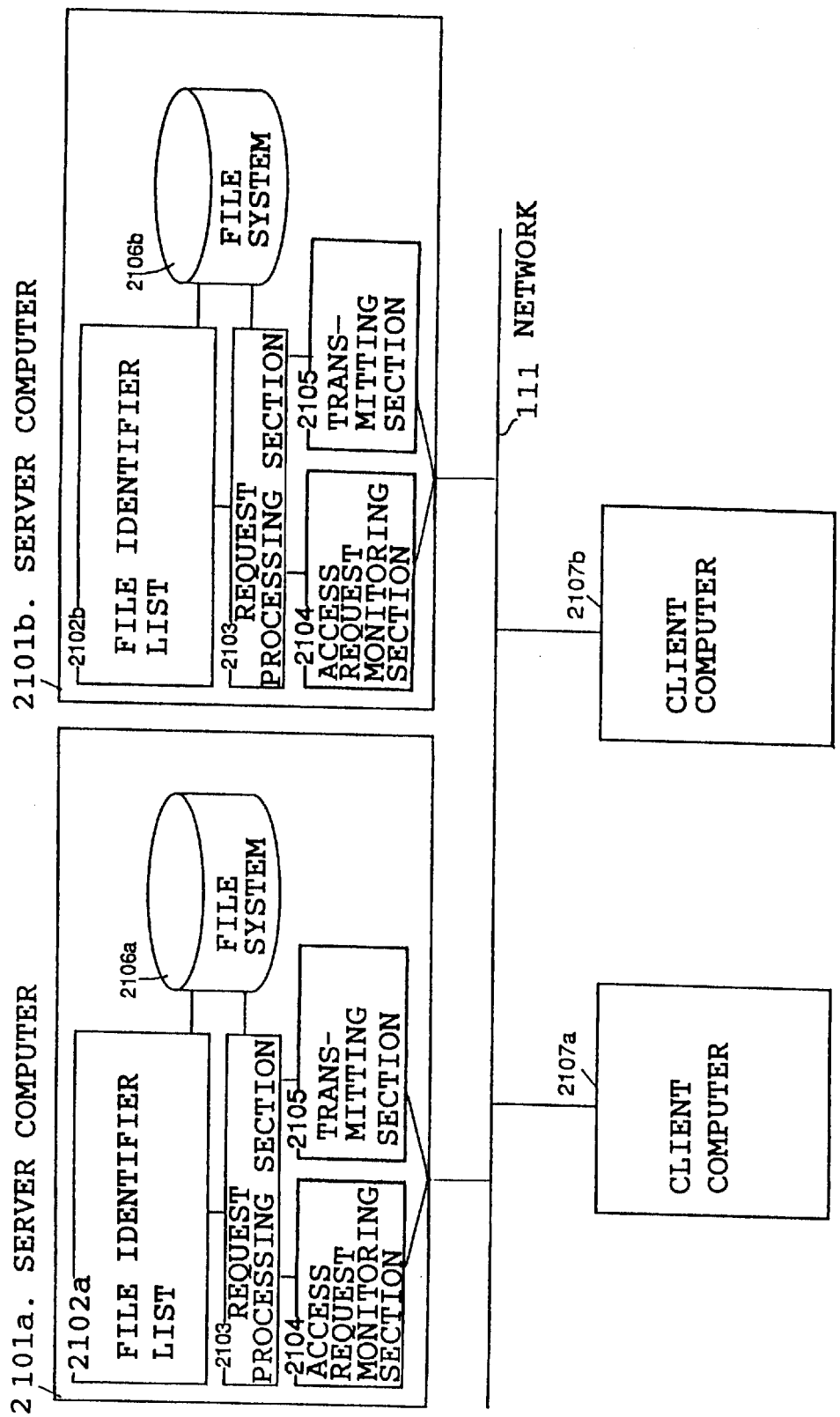

Fig. 23

2102a. FILE IDENTIFIER LIST

| FILE_A |
|---|
| FILE_B |
| FILE_C |

Fig. 24

2102b. FILE IDENTIFIER LIST

| FILE_D |
|---|
| FILE_E |

Fig. 25

| ORIGINATOR | 2107b |
|---|---|
| DESTINATION | V_SERVER |
| FILE IDENTIFIER | FILE_D |
| COMMAND | Read |

Fig. 27

| FILE_A |
|---|
| FILE_B |
| FILE_C |
| FILE_D |
| FILE_E |

Fig. 28

| FILE_A |
|---|
| FILE_B |
| FILE_C |
| FILE_D |
| FILE_E |
| FILE_F |

Fig. 29

2102b. FILE IDENTIFIER LIST

| FILE_D |
|---|
| FILE_E |
| FILE_F |

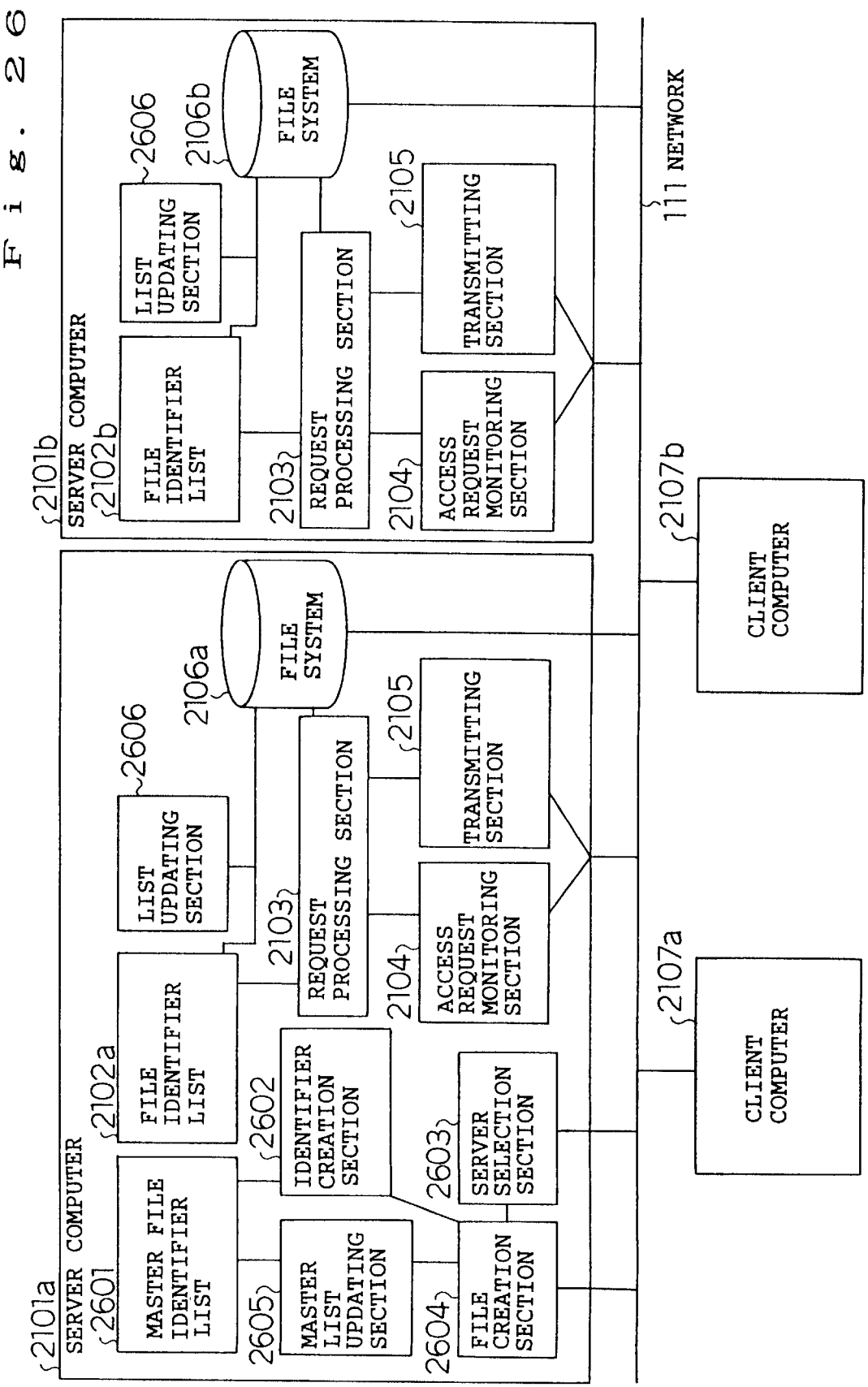

3003 MANAGEMENT TABLE

| VIRTUAL FILE ID | SERVER ID | REAL FILE ID |
|---|---|---|
| A | 3001b | a |

Fig. 37(a)

3104 VIRTUAL FILE MANAGEMENT TABLE

| VIRTUAL FILE ID | SERVER ID | REAL FILE ID |
|---|---|---|
| V_001 | 101 | FILE_101A |
| V_002 | 101 | FILE_101B |
| V_003 | 101 | FILE_101C |
| V_004 | 102 | FILE_102A |
| V_005 | 102 | FILE_102B |

Fig. 37(b)

3104 VIRTUAL FILE MANAGEMENT TABLE

| VIRTUAL FILE ID | SERVER ID | REAL FILE ID |
|---|---|---|
| V_001 | 102 | FILE_102C |
| V_002 | 101 | FILE_101B |
| V_003 | 101 | FILE_101C |
| V_004 | 102 | FILE_102A |
| V_005 | 102 | FILE_102B |

Fig. 38(A)

3106. FILE ACCESS TABLE

| VIRTUAL FILE ID | ACCESS COUNT |
|---|---|
| v_001 | 12 |
| v_002 | 10 |
| v_003 | 3 |
| v_004 | 2 |
| v_005 | 1 |

Fig. 38(B)

3106. FILE ACCESS TABLE

| VIRTUAL FILE ID | ACCESS COUNT |
|---|---|
| v_001 | 12 |
| v_002 | 11 |
| v_003 | 3 |
| v_004 | 2 |
| v_005 | 1 |

Fig. 38(C)

3106. FILE ACCESS TABLE

| VIRTUAL FILE ID | ACCESS COUNT |
|---|---|
| v_001 | 0 |
| v_002 | 0 |
| v_003 | 0 |
| v_004 | 0 |
| v_005 | 0 |

Fig. 39

| ORIGINATOR | 112 |
|---|---|
| DESTINATION | 101 |
| FILE IDENTIFIER | v_002 |
| COMMAND | READ |

Fig. 43 (A)

3701. SERVER ACCESS TABLE

| SERVER ID | ACCESS COUNT |
|---|---|
| 101 | 25 |
| 102 | 3 |

Fig. 43 (B)

3701. SERVER ACCESS TABLE

| SERVER ID | ACCESS COUNT |
|---|---|
| 101 | 26 |
| 102 | 3 |

Fig. 43 (C)

3701. SERVER ACCESS TABLE

| SERVER ID | ACCESS COUNT |
|---|---|
| 101 | 0 |
| 102 | 0 |

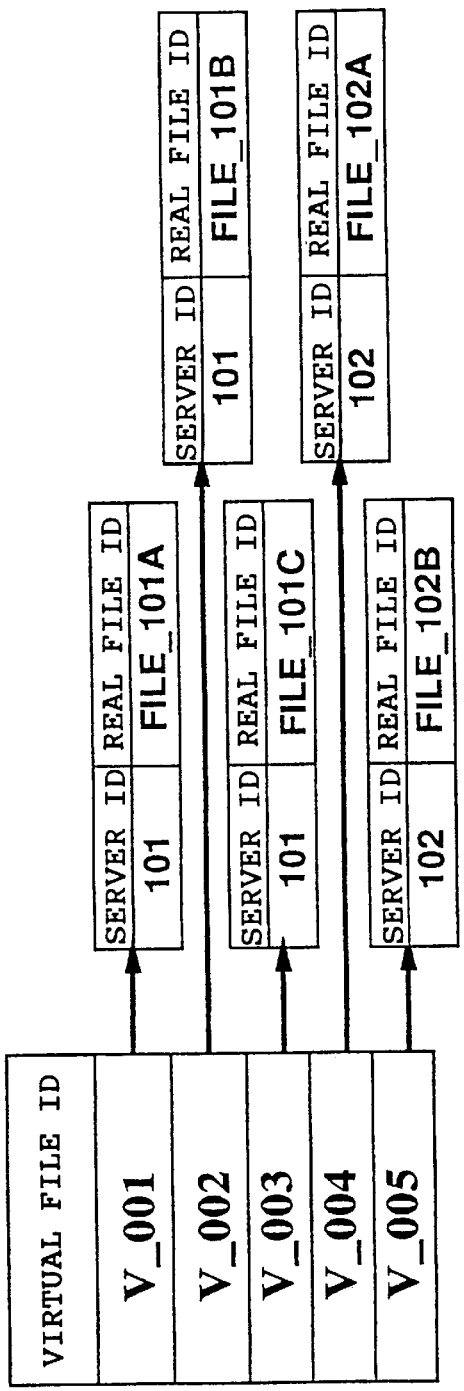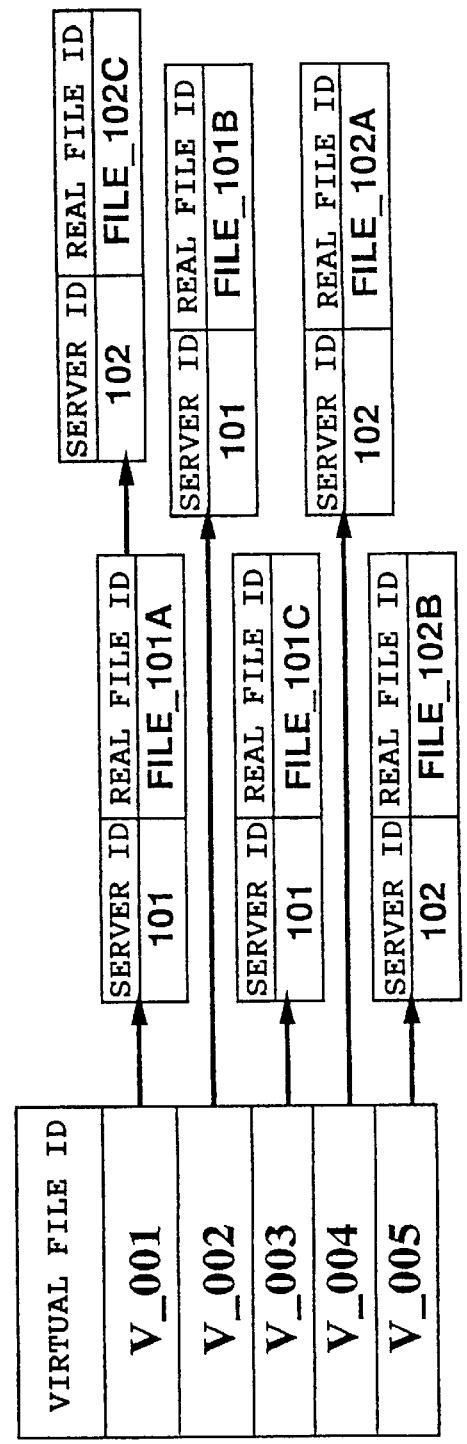

VIRTUAL FILE MANAGEMENT SYSTEM

BACKGROUND OF THE INVENTION

1. Field of the Invention

The present invention relates to a virtual file management system that allows sharing of files, for example, in a client/server computing system, and more particularly to a virtual file management system that can be utilized to distribute server workload.

2. Related Art of the Invention

In recent years, storage capacity demanded of a system has been increasing rapidly in order to handle large volumes of data such as video data. With this trend, client/server information processing systems have come to be constructed with a plurality of servers to increase the processing capabilities of the entire system by distributing access requests from terminals (client computers), while securing larger storage capacities with data distributed across the plurality of servers for storage.

In such client/server information processing systems with multiple server computers, since each individual client computer (terminal) is tasked with the management of mount tables, etc. for server computers that it uses, increased complexity of the management becomes a problem.

To solve this problem, Japanese Patent Unexamined Publication No. 5-241934 discloses a method which realizes a system that performs flexible file management to handle the addition of servers and transfer of files. According to this method, a client computer can access files distributed across a plurality of server computers by accessing a single virtual file management system regardless of the actual location of the files. The operation of the virtual file management system disclosed in Japanese Patent Unexamined Publication No. 5-241934 will be described briefly below with reference to relevant drawings.

Figure 30:
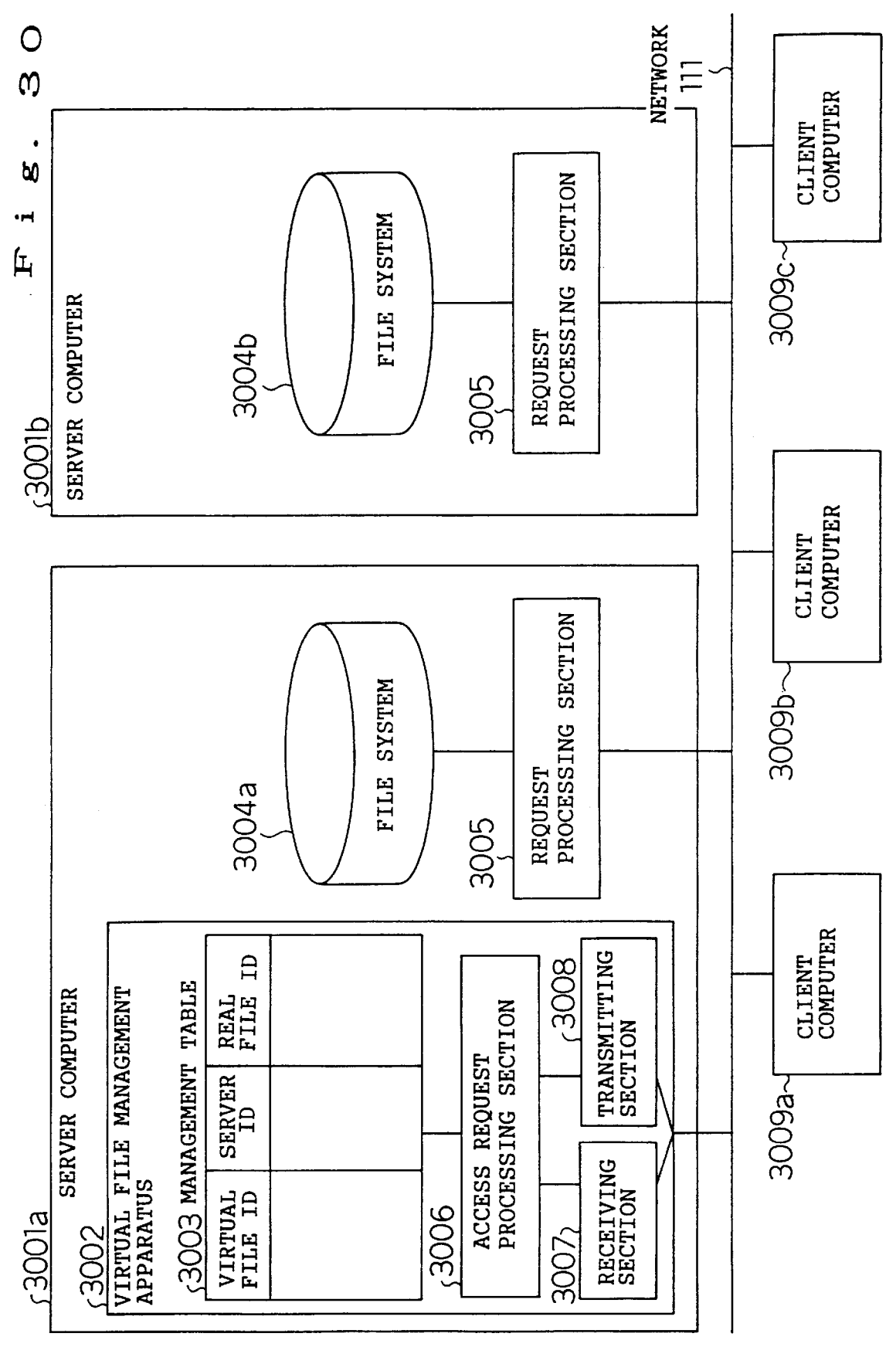

FIG. 30 is a diagram showing the configuration of the virtual file management system proposed in Japanese Patent Unexamined Publication No. 5-241934, and FIG. 31 is a diagram illustrating a flow of operations when a terminal accesses a file stored on a server computer by using the virtual file management system. In FIG. 30, reference numerals 3001*a* and 3001*b* designate server computers. Reference numeral 3002 indicates a virtual file management apparatus operating in the server computer 3001*a*; the apparatus comprises a management table 3003 which manages each of the files stored across the entire system by using a set of attributes consisting of a virtual file identifier, a server identifier, and a real file identifier in the associated server, an access request processing section 3006 which processes file access requests, a receiving section 3007 which receives file access requests, and a transmitting section 3008 which transmits data. Further, reference numerals 3004*a* and 3004*b* designate file systems which are managed within the server computers 3001*a* and 3001*b*, respectively; 3005 represents request processing sections which process file access requests made to the file systems 3004*a* and 3005, respectively; and 3009*a*, 3009*b*, and 3009*c* are client computers. The client computers, 3009*a*, 3009*b*, and 3009*c*, and the server computers, 3001*a* and 3001*b*, are connected through a network 111, as shown.

The operation of the thus constructed virtual file management system will be described below with reference to FIGS. 30 and 31. Suppose that when the contents of the management table 3003 in the virtual file management apparatus 3002 such as shown in FIG. 32 show that the server identifier is 3001*b* and the real file identifier is "a" for the virtual file identifier A, a read access request designating the virtual file identifier A is issued from the client computer 3009*a*. In that case, the receiving section 3007 of the virtual file management apparatus 3002 in the server computer 3001*a* receives the read access request from the client computer 3009*a* (step S3101). Next, the access request processing section 3006 checks the management table 3003, and acquires the server identifier 3001*b* and the real file identifier "a" for the virtual file identifier A (step S3102). Then, a read access request designating the file identifier "a" is issued from the transmitted section 3008 to the server computer 3001*b* (step S3103). In the server computer 3001*b* that received the read access request for the file identifier "a", the request processing section 3005 reads data of the file identifier "a" from the file system 3004*b*, and sends a response to the server computer 3001*a*. In the server computer 3001*a*, the receiving section 3007 receives from the server computer 3001*b* the response to the read access request for the file identifier "a" (step S3104). Next, the received response data is transmitted from the transmitting section 3008 as response data to the client computer 3009*a* that originated the read access request (step S3105).

In this way, in the system disclosed in Japanese Patent Unexamined Publication No. 5-241934, file access requests from the client computers are all received by one particular server computer. More specifically, when a file access request is received, that particular server computer, based on the virtual file identifiers it manages, retrieves data of the requested file from the server computer where the real data of the file is stored, and transfers the retrieved data to the requesting client computer; in this way, each client computer can access files distributed across the plurality of server computers regardless of the actual location of the requested file.

However, since response data to the requesting client computer is always transferred twice through the network, first from the server computer where the real data of the file is stored to the server computer where the virtual file management apparatus is operating, and then from this latter server computer to the requesting client computer, the above configuration has had the problem that not only the delay in responding to the client computer becomes large but also the network workload increases by a factor of 2 as compared with a system that does not use such a virtual file management apparatus.

Furthermore, despite the use of multiple server computers, when file access requests are made simultaneously from multiple client computers for a limited number of files, for example, access is concentrated on a particular server computer and the response speed to the client computers decreases.

Concentration of access to a particular server computer can be avoided by predicting the frequency of file accesses and thereby scheduling storing of files across multiple server computers in such a manner as to distribute the file accesses, but the prior art has had the problem that it has not been possible to reduce the concentration of access to a particular server by dynamically distributing the accesses on the basis of changing access frequencies while the system is operating.

SUMMARY OF THE INVENTION

In view of the above-outlined problems, it is an object of the present invention to provide a virtual file management system that reduces network workload and improves responsiveness to client computers, and that can further improve the workload distribution among the servers constructed as a system, that is, the processing capabilities of the entire system, as compared with the prior art system.

A virtual file management system of the present invention, constructed with a plurality of servers and a plurality of terminals that share file services provided by said servers, is that a virtual file management apparatus operating in at least one of said plurality of servers is provided that comprises: a management table which manages files stored on said plurality of servers by using virtual file identifiers, and in which a server name of a server where real data is stored and a real file identifier in said server are stored as a set for each of said virtual file identifiers; a receiving section which receives a file access request from each of said terminals; a request analyzing section which checks said management table by using the virtual file identifier contained in the file access request received by said receiving section, and thereby determines the server where the real data of the requested file is stored; a transmitting section which transmits data; and a request modification processing section which modifies said file access request so that a response to said file access request can be sent back to the terminal that issued said access request, directly from the server determined by said request analyzing section, and which instructs said transmitting section to transmit said modified file access request to said determined server, and said plurality of servers each include a request processing section which receives the file access request transmitted from said transmitting section of said virtual file management apparatus, and processes said received file access request, and which transmits the processed result to said terminal at least when said file access request is a request to read file contents.

A virtual file management system of the present invention comprises a plurality of servers for storing files, a plurality of terminals for issuing requests for supply of designated files from among said files, and a network connecting said servers with said terminals, wherein at least one of said servers includes: file management means for managing corresponding relationships between the files stored on said plurality of servers and the servers where the files are stored; request frequency storage means for storing the frequencies of the requests made from said terminals within a prescribed period of time for each managed file and/or for each managed server; and file move control means for selecting a file satisfying a prescribed criterion from among said managed files by using said stored request frequencies, and for moving said selected file from the server where said file is stored to another server.

A medium of the present invention is for use with a virtual file management system constructed with a plurality of servers and a plurality of terminals that share file services provided by said servers, said medium providing a program recorded thereon for implementing: a function A that manages files stored on said plurality of servers by using virtual file identifiers and that stores a server name of a server where real data is stored and a real file identifier in said server as a set in a management table for each of said virtual file identifiers; a function B that receives a file access request from each of said terminals; a function C that checks said management table by using the virtual file identifier contained in said received file access request, and thereby determines the server where the real data of the requested file is stored; a function D that modifies said file access request so that a response to said file access request can be sent back to the terminal that issued said access request, directly from said determined server, and that instructs a transmitting section to transmit said modified file access request to said determined server; and a function E that receives the file access request transmitted from said transmitting section and processes said received file access request, and that transmits the processed result to said terminal at least when said file access request is a request to read file contents.

A medium of the present invention is for use with a virtual file management system constructed with a plurality of servers and a plurality of terminals that share file services provided by said servers, said medium providing a program recorded thereon for implementing: a function A that manages files stored on said plurality of servers by using virtual file identifiers and that stores a server name of a server where real data is stored, a real file identifier in said server, and an access inhibit flag as a set in a management table for each of said virtual file identifiers; a function B that receives a file access request from each of said terminals; a function C that checks said management table by using the virtual file identifier contained in said received file access request, and thereby determines the server where the real data of the requested file is stored; a function D that modifies said file access request so that a response to said file access request can be sent back to the terminal that issued said access request, directly from said determined server, and that instructs a transmitting section to transmit said modified file access request to said determined server; a function E that checks said management table in connection with the file requested in said received file access request, and that, when said access inhibit flag is set, instructs said transmitting section to transmit data indicating an access inhibited condition to said terminal, but when said access inhibit flag is not set, passes said file access request to a request analyzing section that performs the function C; and a function F that receives the file access request transmitted from said transmitting section, processes said received file access request, and transmits the processed result to said terminal.

A medium of the present invention is for use with a virtual file management system constructed with a plurality of servers and a plurality of terminals that share file services provided by said servers, said medium providing a program recorded thereon for implementing: a function A that manages files stored on said plurality of servers by using virtual file identifiers and that stores a server name of a server where real data is stored and a real file identifier in said server as a set in a management table for each of said virtual file identifiers; a function B that manages data indicating whether said server is operating or not, by using an operating condition management table; a function C that receives a file access request from each of said terminals; a function D that checks said management table by using the virtual file identifier contained in said received file access request, and thereby determines the server where the real data real data of the requested file is stored; a function E that checks said operating condition management table to determine whether said determined server is operating or not, and that, when said server is not operating, instructs a transmitting section to transmit data indicating a non-operating condition to said terminal, but when said server is operating, modifies said file access request so that a response to said file access request can be sent back to the terminal that issued said access request, directly from said determined server, and instructs said transmitting section to transmit said modified file access request to said determined server; and a function F that receives the file access request transmitted from said transmitting section, processes said received file access request, and transmits the processed result to said terminal.

A medium of the present invention is for use with a virtual file management system constructed with a plurality of servers and a plurality of terminals that share file services provided by said servers, and capable of supporting a configuration in which file access requests from said terminals are issued to a virtual server that is different from said plurality of servers and that does not exist physically, said medium providing a program recorded thereon for implementing, within each of said plurality of servers, a function A that manages file identifiers stored in each server by using a file identifier list; a function B that processes a file access request and that instructs a transmitting section to transmit the processed result to said terminals; and a function C that monitors a file access request being made from said terminals to said virtual server, and that passes said file access request to said function B only when the file identifier contained in said file access request is stored in said file identifier list.

A medium of the present invention is providing a program recorded thereon for implementing, within at least one of a plurality of servers where files are stored, a function A that manages corresponding relationships between the files stored on said plurality of servers and the servers where the files are stored; a function B that stores the frequencies of requests made from terminals within a prescribed period of time for each managed file and/or for each managed server; and a function C that selects a file satisfying a prescribed criterion from among said managed files by using said stored request frequencies, and moves said selected file from the server where said file is stored to another server.

A medium of the present invention is providing a program recorded thereon for implementing, within at least one of a plurality of servers where files are stored, a function A that manages corresponding relationships between the files stored on said plurality of servers and the servers where the files are stored; a function B that stores the frequencies of requests made from terminals within a prescribed period of time for each managed file and/or for each managed server; a function C that selects a file satisfying a prescribed criterion from among said managed files by using said stored request frequencies, and duplicates said selected file to a server different from the server where said file is stored; and a function D that, when said requests occur simultaneously for said duplicated file, processes said requests by also including said different server as a target.

A medium of the present invention is for use with a virtual file management system constructed with a plurality of servers and a plurality of terminals that share file services provided by said servers, at least one of said plurality of servers including a virtual file management apparatus which centrally manages files stored on said plurality of servers by using a virtual file management table in which a virtual file identifier, a server identifier of each of said servers, and a real file identifier of each of said files are stored as a set, said medium providing a program recorded thereon for implementing, within said virtual file management apparatus, a function A that stores an access count for each of said virtual file identifiers in a file access table; a function B that, when said virtual file management apparatus has received a file access request for a virtual file identifier from any one of said terminals, updates the access count corresponding to said virtual file identifier in said file access table; and a function C that is activated by a timer at predetermined intervals of time, and that checks the access counts in said file access table, moves real data corresponding to one or more virtual file identifiers between said plurality of servers, updates said virtual file management table, and resets said file access table.

A medium of the present invention is for use with a virtual file management system constructed with a plurality of servers and a plurality of terminals that share file services provided by said servers, at least one of said plurality of servers including a virtual file management apparatus which centrally manages files stored on said plurality of servers by using a virtual file management table in which a virtual file identifier, a server identifier of each of said servers, and a real file identifier of each of said files are stored as a set, said medium providing a program recorded thereon for implementing, within said virtual file management apparatus, a function A that stores an access count for each of said server identifiers in a server access table; a function B that, when said virtual file management apparatus has received a file access request for a virtual file identifier from any one of said terminals, locates the server identifier corresponding to said virtual file identifier in said virtual file management table, and updates the access count corresponding to said server identifier in said server access table; and a function C that is activated by a timer at predetermined intervals of time, and that checks the access counts in said server access table, moves real data corresponding to one or more virtual file identifiers between said plurality of servers, updates said virtual file management table, and resets said server access table.

A medium of the present invention is for use with a virtual file management system constructed with a plurality of servers and a plurality of terminals that share file services provided by said servers, at least one of said plurality of servers including a virtual file management apparatus which centrally manages files stored on said plurality of servers by using a virtual file management table in which a virtual file identifier, a server identifier of each of said servers, and a real file identifier of each of said files are stored as a set,, said medium providing a program recorded thereon for implementing, within said virtual file management apparatus, a function A that stores an access count for each of said virtual file identifiers in a file access table; a function B that stores an access count for each of said server identifiers in a server access table; a function C that, when said virtual file management apparatus has received a file access request for a virtual file identifier from any one of said terminals, locates the server identifier corresponding to said virtual file identifier in said virtual file management table, and updates the access count corresponding to said virtual file identifier in said file access table as well as the access count corresponding to said server identifier in said server access table; and a function D that is activated by a timer at predetermined intervals of time, and that checks the access counts in said server access table as well as in said file access table, moves real data corresponding to one or more virtual file identifiers between said plurality of servers, updates said virtual file management table, and resets said file access table and said server access table.

A medium of the present invention is for use with a virtual file management system constructed with a plurality of servers and a plurality of terminals that share file services provided by said servers, at least one of said plurality of servers including a virtual file management apparatus which centrally manages files stored on said plurality of servers by using a virtual file management table in which a plurality of identifier pairs, each consisting of a server identifier of each of said servers and a real file identifier of each of said files, are stored in corresponding relationship to each virtual file identifier, said medium providing a program recorded thereon for implementing, within said virtual file management apparatus, a function A that stores an access count for each of said virtual file identifiers in a file access table; a function B that, when said virtual file management apparatus has received a file access request for a virtual file identifier from any one of said terminals, updates the access count corresponding to said virtual file identifier in said file access table; and a function C that is activated by a timer at predetermined intervals of time, and that checks the access counts in said file access table, duplicates real data corresponding to a frequently accessed virtual file identifier to one or more servers selected from among said plurality of servers, adds the real file identifier and server identifier of the duplicated data to said virtual file management table, and resets said file access table.

A medium of the present invention is for use with a virtual file management system constructed with a plurality of servers and a plurality of terminals that share file services provided by said servers, at least one of said plurality of servers including a virtual file management apparatus which centrally manages files stored on said plurality of servers by using a virtual file management table in which a plurality of identifier pairs, each consisting of a server identifier of each of said servers and a real file identifier of each of said files, are stored in corresponding relationship to each virtual file identifier, said medium providing a program recorded thereon for implementing, within said virtual file management apparatus, a function A that stores an access count for each of said virtual file identifiers in a file access table; a function B that, when said virtual file management apparatus has received a file access request for a virtual file identifier from any one of said terminals, updates the access count corresponding to said virtual file identifier in said file access table; and a function C that is activated by a timer at predetermined intervals of time, and that checks the access counts in said file access table, duplicates real data corresponding to a frequently accessed virtual file identifier to one or more servers selected from among said plurality of servers, deleting all but one or more server identifier/real file identifier pairs from said virtual file management table for an infrequently accessed virtual file identifier, updates said virtual file management table, and resets said file access table.

A medium of the present invention is for use with a virtual file management system constructed with a plurality of servers and a plurality of terminals that share file services provided by said servers, wherein a virtual file management apparatus operating in at least one of said plurality of servers manages files stored on said plurality of servers by using virtual file identifiers, stores a server name of a server where real data is stored and a real file identifier in said server as a set in a management table for each of said virtual file identifiers, receives a file access request from each of said terminals, checks said management table by using the virtual file identifier contained in said received file access request, thereby determines the server where the real data of the requested file is stored, modifies said file access request so that a response to said file access request can be sent back to the terminal that issued said access request, directly from said determined server, and instructs a transmitting section to transmit said modified file access request to said determined server, and said plurality of servers receive the file access request transmitted from said transmitting section of said virtual file management apparatus, process said received file access request, and transmit the processed result to said terminal at least when said file access request is a request to read file contents, whereby said medium provides a program recorded thereon for implementing: a function A that manages said files stored on said plurality of servers by using said virtual file identifiers and that stores the server name of the server where the real data is stored and the real file identifier in said server as a set in said management table for each of said virtual file identifiers; a function B that receives a file access request from each of said terminals; a function C that checks said management table by using the virtual file identifier contained in said received file access request, and thereby determines the server where the real data of the requested file is stored; a function D that modifies said file access request so that the response to said file access request can be sent back to the terminal that issued said access request, directly from said determined server, and that instructs said transmitting section to transmit said modified file access request to said determined server.

A medium of the present invention is for use with a virtual file management system constructed with a plurality of servers and a plurality of terminals that share file services provided by said servers, wherein a virtual file management apparatus operating in at least one of said plurality of servers manages files stored on said plurality of servers by using virtual file identifiers, stores a server name of a server where real data is stored, a real file identifier in said server, and an access inhibit flag as a set in a management table for each of said virtual file identifiers, receives a file access request from each of said terminals, checks said management table by using the virtual file identifier contained in said received file access request, thereby determines the server where the real data of the requested file is stored, modifies said file access request so that a response to said file access request can be sent back to the terminal that issued said access request, directly from said determined server, instructs a transmitting section to transmit said modified file access request to said determined server, checks said management table in connection with the file requested in said received file access request, and when said access inhibit flag is set, instructs said transmitting section to transmit data indicating an access inhibited condition to said terminal, but when said access inhibit flag is not set, passes said file access request to a request analyzing section of said virtual file management apparatus, and said plurality of servers receive the file access request transmitted from said transmitting section of said virtual file management apparatus, process said received file access request, and transmit the processed result to said terminal, whereby said medium provides a program recorded thereon for implementing: a function A that manages said files stored on said plurality of servers by using said virtual file identifiers and that stores the server name of the server where the real data is stored, the real file identifier in said server, and the access inhibit flag as a set in said management table for each of said virtual file identifiers; a function B that receives a file access request from each of said terminals; a function C that checks said management table by using the virtual file identifier contained in said received file access request, and thereby determines the server where the real data of the requested file is stored; a function D that modifies said file access request so that the response to said file access request can be sent back to the terminal that issued said access request, directly from said determined server, and that instructs said transmitting section to transmit said modified file access request to said determined server; and a function E that checks said management table in connection with the file requested in said received file access request, and that, when said access inhibit flag is set, instructs said transmitting section to transmit the data indicating an access inhibited condition to said terminal, but when said access inhibit flag is not set, passes said file access request to said request analyzing section.

A medium of the present invention is for use with a virtual file management system constructed with a plurality of servers and a plurality of terminals that share file services provided by said servers, wherein a virtual file management apparatus operating in at least one of said plurality of servers manages files stored on said plurality of servers by using virtual file identifiers, stores a server name of a server where real data is stored and a real file identifier in said server as a set in a management table for each of said virtual file identifiers, manages data indicating whether said server is operating or not by using an operating condition management table, receives a file access request from each of said terminals, checks said management table by using the virtual file identifier contained in said received file access request, thereby determines the server where the real data of the requested file is stored, checks said operating condition management table to determine whether said determined server is operating or not, and when said server is not operating, instructs a transmitting section to transmit data indicating a non-operating condition to said terminal, but when said server is operating, modifies said file access request so that a response to said file access request can be sent back to the terminal that issued said access request, directly from said determined server, and instructs said transmitting section to transmit said modified file access request to said determined server, and said plurality of servers receive the file access request transmitted from said transmitting section of said virtual file management apparatus, process said received file access request, and transmit the processed result to said terminal, whereby said medium provides a program recorded thereon for implementing: a function A that manages said files stored on said plurality of servers by using said virtual file identifiers and that stores the server name of the server where the real data is stored and the real file identifier in said server as a set in said management table for each of said virtual file identifiers; a function B that manages data indicating whether said server is operating or not, by using said operating condition management table; a function C that receives a file access request from each of said terminals; a function D that checks said management table by using the virtual file identifier contained in said received file access request, and thereby determines the server where the real data of the requested file is stored; and a function E that checks said operating condition management table to determine whether said determined server is operating or not, and that, when said server is not operating, instructs said transmitting section to transmit the data indicating a non-operating condition to said terminal, but when said server is operating, modifies said file access request so that the response to said file access request can be sent back to the terminal that issued said access request, directly from said determined server, and instructs said transmitting section to transmit said modified file access request to said determined server.

A medium of the present invention is for use with a virtual file management system constructed with a plurality of servers and a plurality of terminals that share file services provided by said servers, and capable of supporting a configuration in which file access requests from said terminals are issued to a virtual server that is different from said plurality of servers and that does not exist physically, wherein each of said plurality of servers manages file identifiers stored in each server by using a file identifier list, processes a file access request, instructs a transmitting section to transmit the processed result to said terminals, monitors a file access request being made from said terminals to said virtual server, and passes said file access request to a function B hereinafter described only when the file identifier contained in said file access request is stored in said file identifier list, whereby said medium provides a program recorded thereon for implementing, within each of said plurality of servers, a function A that manages said file identifiers stored in each server by using said file identifier list; a function B that processes a file access request and that instructs said transmitting section to transmit the processed result: to said terminals; and a function C that monitors the file access request being made from said terminals to said virtual server, and that passes said file access request to said function B only when the file identifier contained in said file access request is stored in said file identifier list.

A medium of the present invention is for use with a system wherein at least one of a plurality of servers where files are stored manages corresponding relationships between the files stored on said plurality of servers and the servers where the files are stored, stores the frequencies of requests made from terminals within a prescribed period of time for each managed file and/or for each managed server, selects a file satisfying a prescribed criterion from among said managed files by using said stored request frequencies, and moves said selected file from the server where said file is stored to another server, whereby said medium provides a program recorded thereon for implementing: a function A that stores the frequencies of the requests made from said terminals within a prescribed period of time for each managed file and/or for each managed server; and a function B that selects a file satisfying the prescribed criterion from among said managed files by using said stored request frequencies, and moves said selected file from the server where said file is stored to another server.

A medium of the present invention is for use with a system wherein at least one of a plurality of servers where files are stored manages corresponding relationships between the files stored on said plurality of servers and the servers where the files are stored, stores the frequencies of requests made from terminals within a prescribed period of time for each managed file and/or for each managed server, selects a file satisfying a prescribed criterion from among said managed files by using said stored request frequencies, duplicates said selected file to a server different from the server where said file is stored, and when said requests occur simultaneously for said duplicated file, processes said requests by also including said different server as a target, whereby said medium provides a program recorded thereon for implementing: a function A that stores the frequencies of the requests made from said terminals within a prescribed period of time for each managed file and/or for each managed server; a function B that selects a file satisfying the prescribed criterion from among said managed files by using said stored request frequencies, and duplicates said selected file to a server different from the server where said file is stored; and a function C that, when said requests occur simultaneously for said duplicated file, processes said requests by also including said different server as a target.

A medium of the present invention is for providing a program recorded thereon for implementing the functions of all or part of the means of the virtual file management system as above-described present invention.

In this way, the processing capabilities of the entire system can be further improved.

BRIEF DESCRIPTION OF THE DRAWINGS

FIG. 3 is a diagram showing the internal structure of a management table according to the first embodiment;

FIG. 4 is a diagram showing the contents of a file access request according to the first embodiment;

FIG. 5 is a diagram showing the contents of a modified file access request according to the first embodiment;

FIG. 8 is a diagram showing the internal structure of a management table according to the second embodiment;

FIG. 9 is a diagram showing the contents of a file access request according to the second embodiment;

FIG. 10 is a block diagram of a virtual file management system according to a third embodiment of the present invention;

FIG. 11 is a diagram showing the internal structure of a management table according to the third embodiment;

FIG. 12 is a block diagram of a virtual file management system according to a fourth embodiment of the present invention;

FIG. 15 is a diagram showing the internal structure of a management table according to the fourth embodiment;

FIG. 16 is a diagram showing the internal structure of the management table according to the fourth embodiment;

FIG. 17 is a diagram showing the internal structure of the management table according to the fourth embodiment;

FIG. 18 is a diagram showing the internal structure of the management table according to the fourth embodiment;

FIG. 20 is a diagram showing the internal structure of an operating condition management table according to the fifth embodiment;

FIG. 21 is a block diagram of a virtual file management system according to a sixth embodiment of the present invention;

FIG. 23 is a diagram showing the internal structure of a file identifier list according to the sixth embodiment;

FIG. 24 is a diagram showing the internal structure of the file identifier list according to the sixth embodiment;

FIG. 25 is a diagram showing the contents of a file access request according to the sixth embodiment;

FIG. 26 is a block diagram of a virtual file management system according to a seventh embodiment of the present invention;

FIG. 27 is a diagram showing the internal structure of a master file identifier list according to the seventh embodiment;

FIG. 28 is a diagram showing the internal structure of the master file identifier list according to the seventh embodiment;

FIG. 29 is a diagram showing the internal structure of a file identifier list according to the seventh embodiment;

FIG. 30 is a diagram showing the configuration of a virtual file management system according to the prior art;

FIG. 32 is a data structure diagram showing one example of a management table in the same prior art;

FIG. 37(a) is a diagram showing the internal structure of a virtual file management table before a file move, according to the ninth embodiment;

FIG. 37(b) is a diagram showing the internal structure of the virtual file management table after a file move, according to the ninth embodiment;

FIG. 38(a) is a diagram showing the internal structure of a file access table before updating, according to the ninth embodiment;

FIG. 38(b) is a diagram showing the internal structure of the file access table after updating, according to the ninth embodiment;

FIG. 38(c) is a diagram showing the internal structure of the file access table after initialization, according to the ninth embodiment;

FIG. 39 is a diagram showing the contents of a file access request according to the ninth embodiment;

FIG. 43(a) is a diagram showing the internal structure of a server access table before updating, according to the 10th embodiment;

FIG. 43(b) is a diagram showing the internal structure of the server access table after updating, according to the 10th embodiment;

FIG. 43(c) is a diagram showing the internal structure of the server access table after initialization, according to the 10th embodiment;

FIG. 46(a) is a diagram showing the internal structure of a virtual file management table before updating, according to the 11th embodiment; and FIG. 46(b) is a diagram showing the internal structure of the virtual file management table after updating, according to the 11th embodiment.

PREFERRED EMBODIMENTS

The present invention will be described in detail below with reference to the accompanying drawings illustrating the preferred embodiments thereof.

Figure 1:
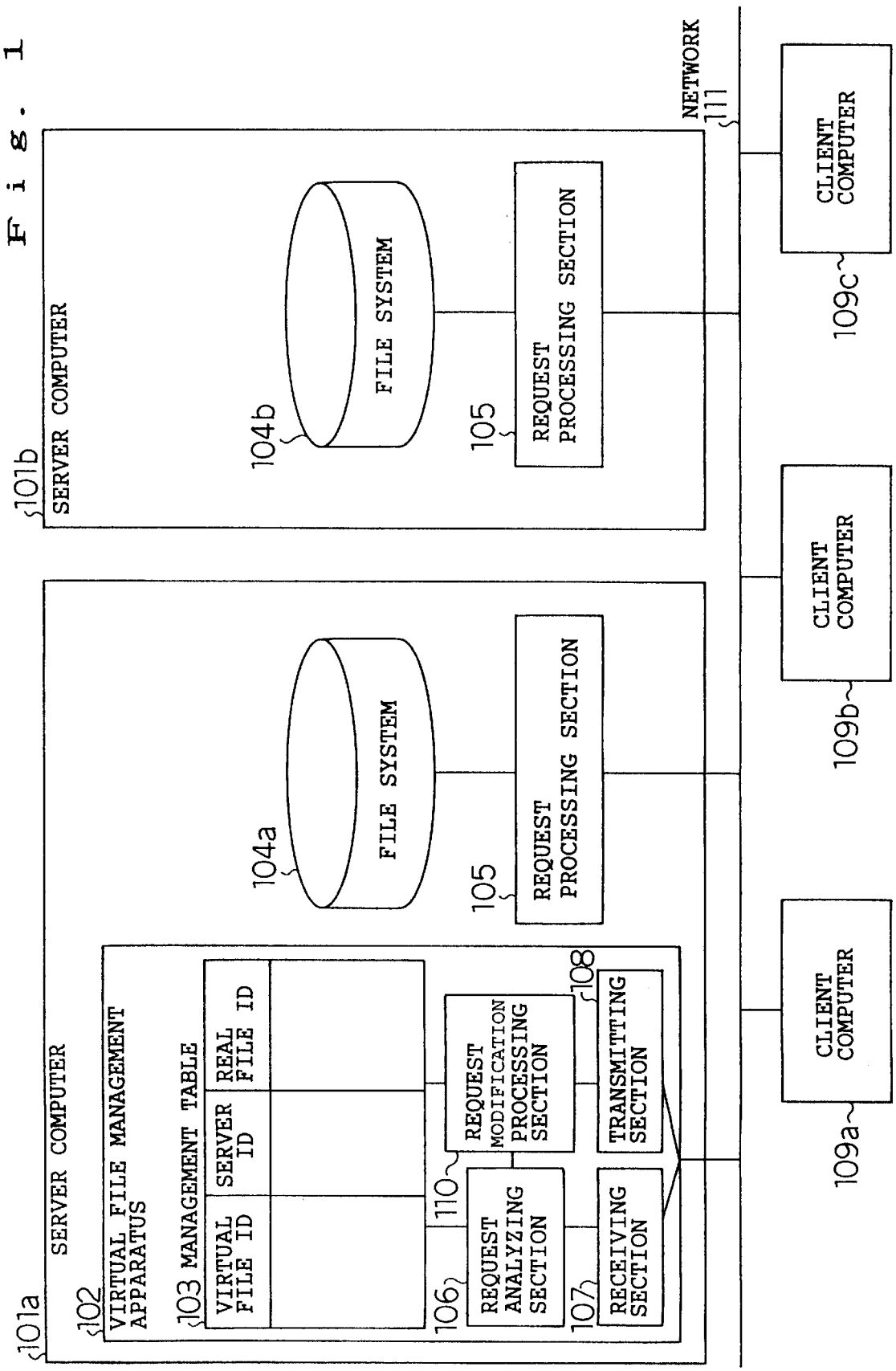
FIG. 1 is a block diagram of a virtual file management system according to a first embodiment of the present invention.

FIG. 1 is a block diagram of a virtual file management system according to a first embodiment of the present invention. This embodiment corresponds to the invention described in claim 1. In FIG. 1, reference numerals 101a and 101b are server computers; 102 is a virtual file management apparatus operating in the server computer 101a; 103 is a management table; 104a and 104b are file systems which are managed within the server computers 101a and 101b, respectively; 105 is a request processing section; 106 is a request analyzing section; 107 is a receiving section; 108 is a transmitting section; 109a, 109b, and 109c are client computers as terminals; 110 is a request modification processing section; and 111 is a network through which the client computers 109a, 109b, and 109c are connected to the server computers 101a and 101b.

The operation of the thus constructed virtual file management system will be described with reference to relevant drawings.

Figure 2:
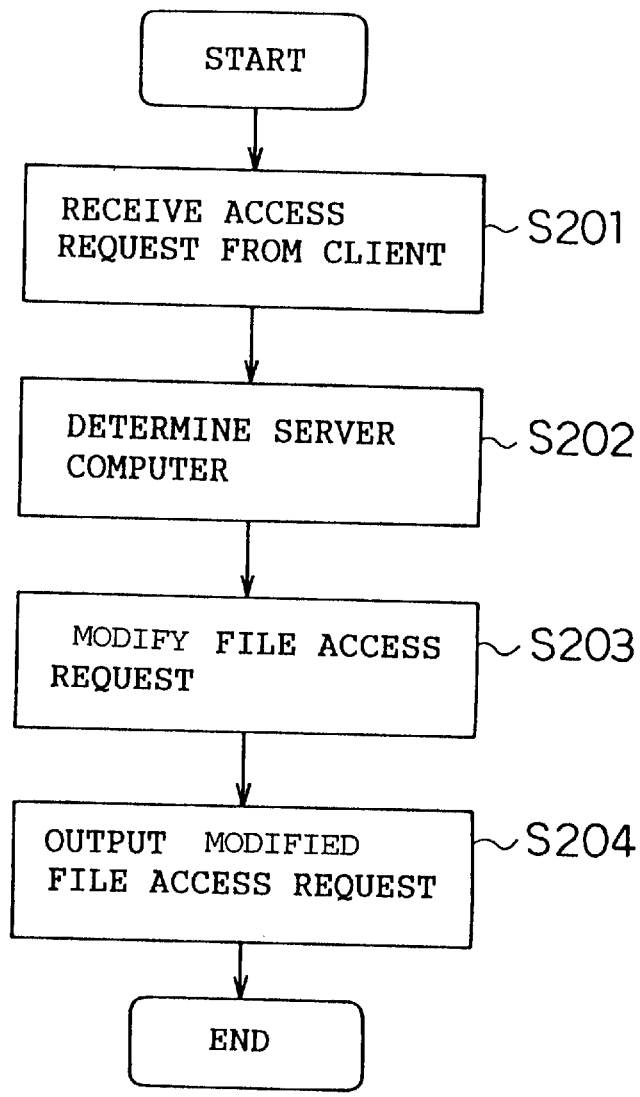
FIG. 2 is a flowchart illustrating a processing flow according to the first embodiment.

FIG. 2 is a diagram illustrating the processing flow in the server computer 101a in which the virtual file management apparatus 102 is operating. First, the receiving section 107 receives a file access request from the client computer 109a (step S201). Next, the request analyzing section 106 checks the virtual file identifier contained in the received file access request, and determines the corresponding server computer name 101a or 101b by referencing the management table 103 (step S202). Next, using data in the management table 103, the request modification processing section 110 first modifies the file access request into a file access request such that the server computer 101a or 101b determined by the request analyzing section 106 can directly respond to the client computer 109a, and then instructs the transmitting section 108 to transmit the modified file access request to the server computer 101a or 101b (step S203). The transmitting section 108 then transmits the file access request to the server computer 101a or 101b (step S204). The request processing section 105 in the server computer 101a or 101b that received the modified file access request creates response data to the file access request by using the file system 104a or 104b, and transmits the response data to the client computer 109a.

In this way, the file access request from the client computer is first modified by the virtual file management apparatus by using the management table, and then transferred to the destination. By so doing, the client computer can obtain response data directly from the server computer where the real data of the requested file is managed, without increasing the network workload.

Next, a specific example of how this embodiment is used will be described. In FIG. 1, there are two files with virtual file identifiers V_001 and V_002 accessible from the client computers; the virtual file identifier V_001 corresponds to a real file identifier FILE_A existing in the file system 104a in the server computer 101a and the virtual file identifier V_002 corresponds to a real file identifier FILE_B existing in the file system 104b in the server computer 101b. In this case, the contents of the management table 103 managed by the virtual file management apparatus 102 in the server computer 101a are as shown in FIG. 3. Here, the virtual file identifiers V_001 and V_002 are managed as unique identifiers without duplications in the management table. In this situation, the processing flow will be described with reference to the flowchart of FIG. 2 when a file access request to read the contents of the file identifier V_002, such as shown in FIG. 4, is issued from the client computer 109a.

First, in step S201, the receiving section 107 of the server computer 101a receives the file access request defined as shown in FIG. 4. Next, in step S202, the request analyzing section 106 searches the management table 103 by using the virtual file identifier contained in the file access request as a key, and determines that the virtual file identifier V_002 corresponds to the real file identifier FILE_B in the server computer 101b. Then, in step S203, the request modification processing section 110 modifies the file access request shown in FIG. 4 into the file access request shown in FIG.

5 on the basis of the contents of the management table 103. More specifically, the destination is changed to 101b and the file identifier to FILE_B. The request modification processing section 110 then instructs the transmitting section 108 to transmit the modified file access request shown in FIG. 5 to the server computer 101b. In step S204, the transmitting section 108 transmits the modified file access request shown in FIG. 5 to the server computer 101b. The request processing section 105 in the server computer 101b that received the modified file access request (FIG. 5) reads the real data corresponding to the file identifier FILE_B from the file system 104b, creates response data to the file access request by using the thus read-out data, and transmits the response data to the client computer 109a. In this way, the client computer 109a can read out the contents of the virtual file identifier V_002 (the real file identifier FILE_B).

The above example of the embodiment has dealt with a case in which a file access request to read the contents of a file is issued from the client computer. The same process applies for the case where a file access request to write data to a file is issued; that is, the request modification processing section modifies the file access request containing write data on the basis of the contents of the management table, and transfers the request to the server computer where the real data of the file is stored, to accomplish data writing to the file.

Furthermore, in the case of a file access request to refer to or update a file attribute (for example, date and time of access, file size, access right, etc.) also, the client's request can be processed in the same manner as described above, that is, by modifying the file access request so that the request is redirected to the server computer where the real data of the file is stored.

Next, a virtual file management system according to a second embodiment of the present invention will be described with reference to relevant drawings. This embodiment corresponds to the invention described in claim 2.

Figure 6:
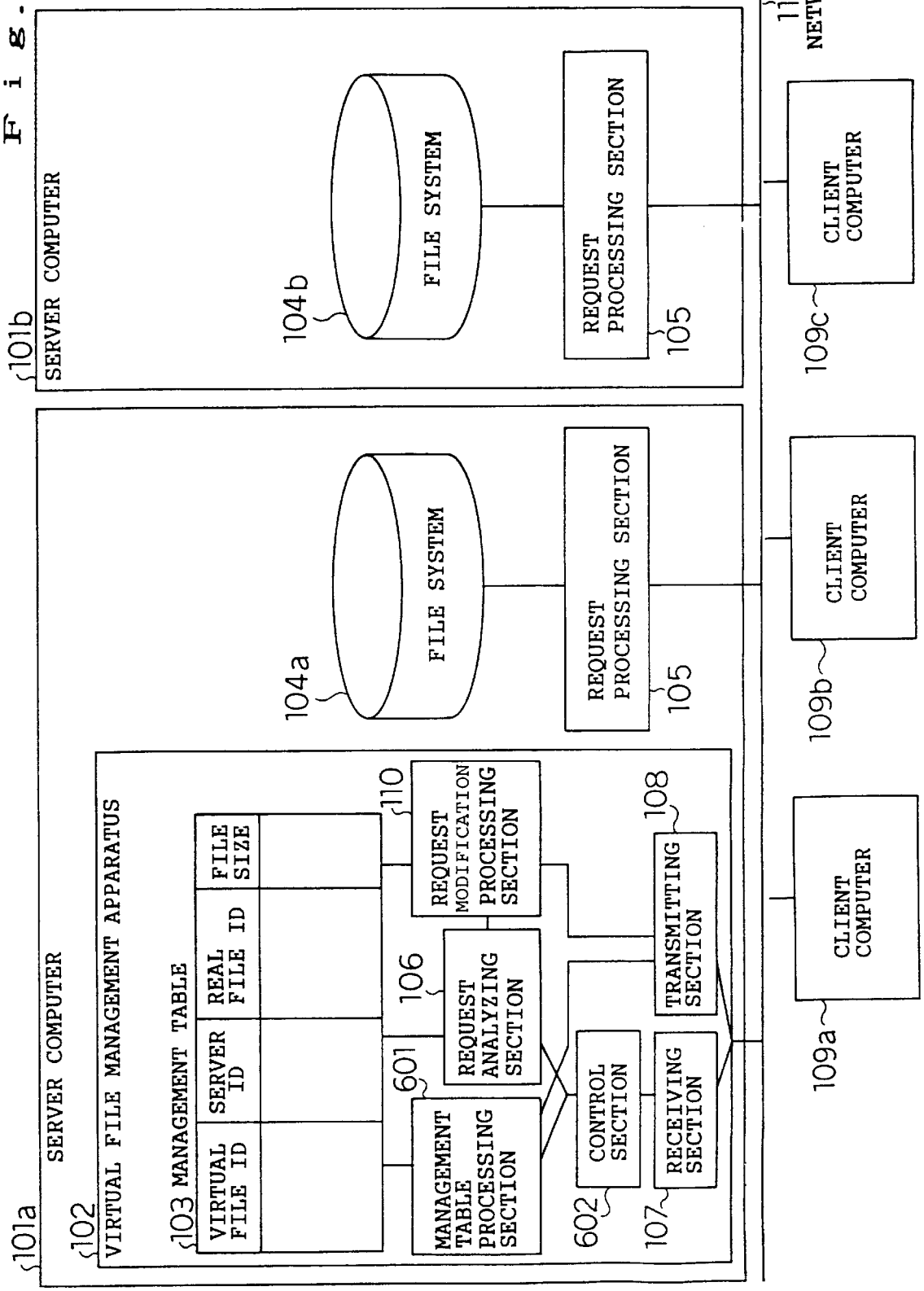
FIG. 6 is a block diagram of a virtual file management system according to a second embodiment of the present invention.

FIG. 6 is a block diagram showing the virtual file management system according to the second embodiment of the present invention. In FIG. 6, reference numeral 601 is a management table processing section, and 602 is a control section; the other component elements are the same as those described in connection with FIG. 1 in the description of the first embodiment.

File access requests from the client computers include not only requests for reading file contents but other types of file access requests such as a file deletion request and file attribute reference request. In the case of the latter types of requests, the server computer where the real data of the requested file is managed need not necessarily send a response to the requesting client computer; rather, by having the virtual file management apparatus managing the files respond to the client computer, the response time can be improved and the network workload can be reduced.

First, the general operation of this embodiment will be described.

Figure 7:
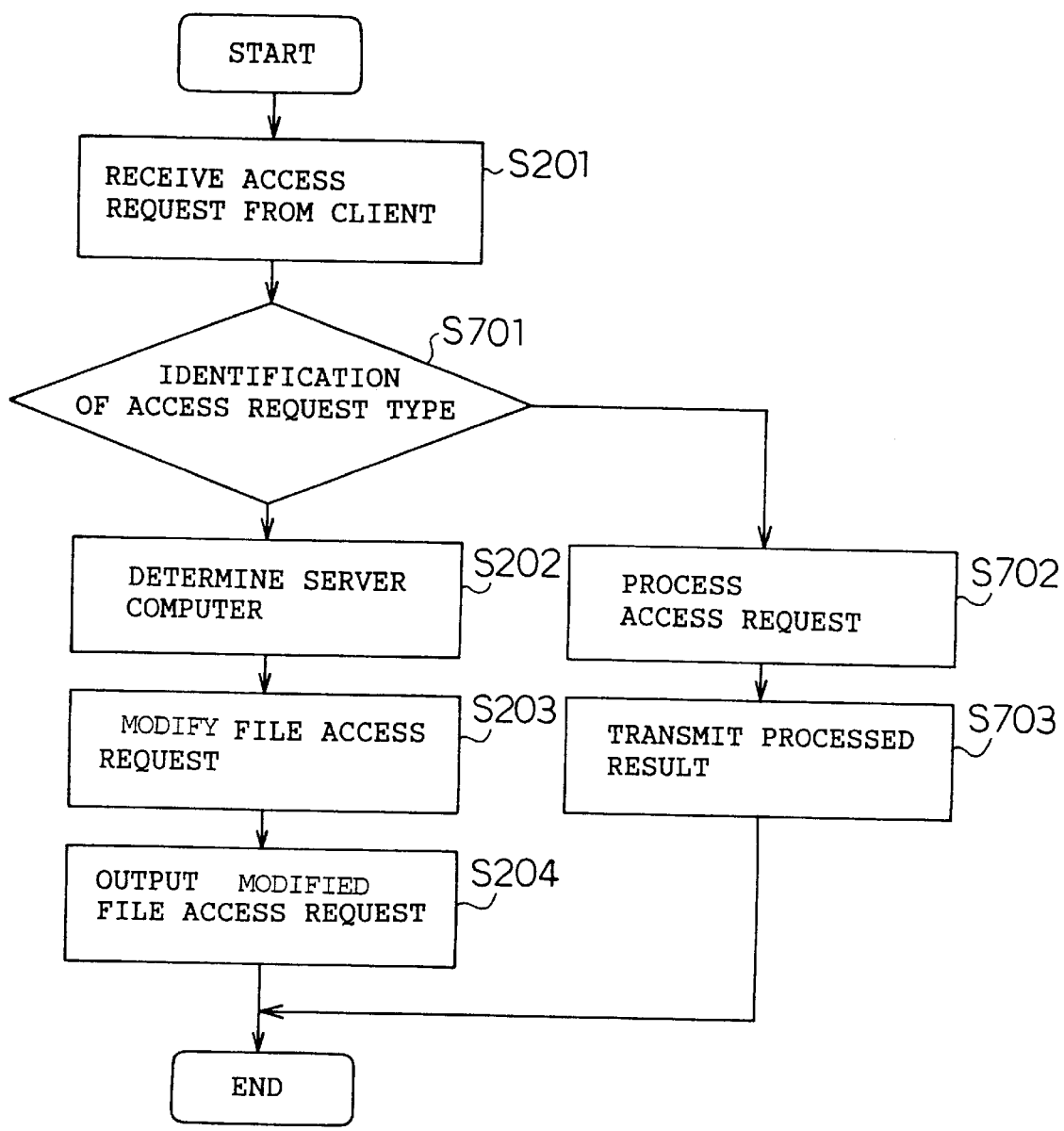
FIG. 7 is a flowchart illustrating a processing flow according to the second embodiment.

FIG. 7 is a flowchart illustrating the processing flow in the server computer 101a in which the virtual file management apparatus 102 of the present embodiment is operating. First, the receiving section 107 receives a file access request from the client computer 109a (step S201). Next, the control section 602 identifies the type of the received file access request (step S701), and carries out step S702 if the request is for updating or referring to the management table 103, or step S202 if the request is not for updating or referring to the management table 103. In step S702, the management table processing section 601 processes the request by using the management table 103, and instructs the transmitting section 108 to transmit the processed result to the client computer 109a. Subsequent to the step S702, the transmitting section 108 transmits the processed result to the client computer 109a (step S703). On the other hand, from step S202 onward, the steps S202, S203, and S204 in FIG. 2 described in the first embodiment are performed in sequence.

Next, a specific example of how this embodiment is used will be described. In FIG. 6, in the management table 103 there are three files with virtual file identifiers V_001, V_002, and V_003 accessible from the client computers; the virtual file identifier V_001 corresponds to a real file identifier FILE_A existing in the file system 104a in the server computer 101a and the virtual file identifiers V_002 and V_003 correspond to real file identifiers FILE_B and FILE_C, respectively, existing in the file system 104b in the server computer 101b. In this case, the contents of the management table 103 managed by the virtual file management apparatus 102 in the server computer 101a are as shown in FIG. 8.

When an access request to refer to the file size of the file V_003, such as shown in FIG. 9, is issued from the client computer 109a to the virtual file management apparatus 102 in the server computer 101a, the receiving section 107 of the server computer 101a in step S201 receives the file access request defined as shown in FIG. 9. Next, in step S701, the control section 602 identifies the type of the file access request. Since the file access request of FIG. 9 contains a command inquiring the file size, this file access request is identified as a request to refer to the management table 103. Accordingly, step S702 is carried out next. In step S702, the management table processing section 601 checks the management table 103 in accordance with the file access request, retrieves the file size corresponding to V_003, and instructs the transmitting section 108 to transmit the retrieved file size to the requesting client computer 109a. Finally, in step S703, the transmitting section 108 transmits the file size to the client computer 109a.

In this way, the client computer 109a can refer to the file size of the virtual file identifier V_003. On the other hand, when the file access request of FIG. 4 is issued from the client computer, it is determined in step S701 that the type of the file access request is not one requesting reference to or updating of the management table 103, and therefore, steps S202, S203, and S204 are carried out in sequence as described in connection with the operation of the first embodiment. The above description has dealt with a file access request for referring to file size as an example, but when referring to other attributes (for example, file update time, owner, access right, etc.) or when updating the management table such as file deletion or attribute change, for example, steps S702 and S703 are likewise carried out.

Next, a virtual file management system according to a third embodiment of the present invention will be described with reference to relevant drawings. This embodiment corresponds to the invention described in claim 3.

FIG. 10 is a block diagram showing the virtual file management system according to the third embodiment of the present invention. In FIG. 10, reference numeral 1001 is an identifier creation section, 1002 is a server selection section, 1003 is a file creation section, and 1004 is a management table updating section; the other component elements are the same as those described in connection with FIG. 1 in the description of the first embodiment.

When creating a new file that is to be managed by the virtual file management apparatus, a server computer where the real data of the file should be stored must be selected. In this embodiment, the virtual file management apparatus is equipped with this function.

The general operation of this embodiment will be described first. When a new file creation request is input to the virtual file management apparatus 102, the identifier creation section 1001 creates a new virtual file identifier, not yet existing in the management table 103, for the file requested to be created. Next, the server selection section 1002 selects one of the server computers connected to the network 111 in accordance with a predetermined method, and supplies the server computer name to the file creation section 1003. The file creation section 1003 then sends a new file creation request to the server computer selected by the server selection section 1002. Using the file system function, the selected server computer creates a new real file identifier in response to the file creation request, and sends the response to the server computer 101a. The file creation section 1003 thus receives the new real file identifier from the selected server computer, and passes the received real file identifier to the management table updating section 1004 along with the name of the server computer selected by the server selection section 1002. Finally, the management table updating section 1004 adds the virtual file identifier, the server computer name, and the real file identifier to the contents of the management table 103.

In this way, the management table 103 managed by the virtual file management apparatus 102 can be automatically constructed, and each client computer can create a new file without having to be aware of the selection of the server computer where the real data of the file should be stored. Using the thus constructed management table 103, the virtual file management system described in the first embodiment operates.

Next, a specific example of how this embodiment is used will be described. As in the first embodiment, in FIG. 10, there are two files with virtual file identifiers V__001 and V__002 accessible from the client computers; the virtual file identifier V__001 corresponds to a real file identifier FILE__A existing in the file system 104a in the server computer 101a and the virtual file identifier V__002 corresponds to a real file identifier FILE__B existing in the file system 104b in the server computer 101b. In this case, the contents of the management table 103 managed by the virtual file management apparatus 102 in the server computer 101a are as shown in FIG. 3.

When a new file creation request is input from a client to the file management apparatus 102, the identifier creation section 1001 creates a new virtual file identifier V__003 not yet existing in the management table 103. Next, the server selection section 1002 queries the server computers 101a and 101b connected to the network 111 about the space available in their file systems 104a and 104b, selects the server computer 101b having the larger available space, and supplies the name of the selected server computer to the file creation section 1003. The file creation section 1003 then sends a query to the file system 104b in the server computer 101b, obtains a real file identifier FILE__C to be used to create the real data of the file, and passes the server computer name 101b and the real file identifier FILE__C to the management table updating section 1004. Finally, the management table updating section 1004 adds the virtual file identifier V__003, the server computer name 101b, and the real file identifier FILE__C to the contents of the management table 103. The result will be as shown in FIG. 11. In this way, the management table 103 is automatically constructed.

In this embodiment, the selection of the server computer has been made based on the available space in its file system, but various other methods can be considered for server computer selection algorithms, such as methods based on the number of files stored in the file system, the processing speed of the server computer, or the degree of workload concentration, or a combination thereof.

Next, a virtual file management system according to a fourth embodiment of the present invention will be described with reference to relevant drawings. This embodiment corresponds to the invention described in claims 4 and 5.

FIG. 12 is a block diagram showing the virtual file management system according to the fourth embodiment of the present invention. In FIG. 12, reference numerals 101a and 101b are server computers; 102 is a virtual file management apparatus operating in the server computer 101a; 1201 is a management table including an access inhibit flag; 104a and 104b are file systems which are managed within the server computers 101a and 101b, respectively; 105 is a request processing section; 106 is a request analyzing section; 107 is a receiving section; 108 is a transmitting section; 1202 is a preprocessing section; 1203 is a file move processing section; 109a, 109b, and 109c are client computers; 110 is a request modification processing section; and 111 is a network through which the client computers 109a, 109b, and 109c are connected to the server computers 101a and 101b.

The operation of the thus constructed virtual file management system will be described below with reference to relevant drawings, dealing specifically with the operation of the file move processing section 1203 when moving real data of a file between the server computers in the present embodiment, and the operation of the virtual file management apparatus 102 when a file access request is received from a client computer.

Figure 13:
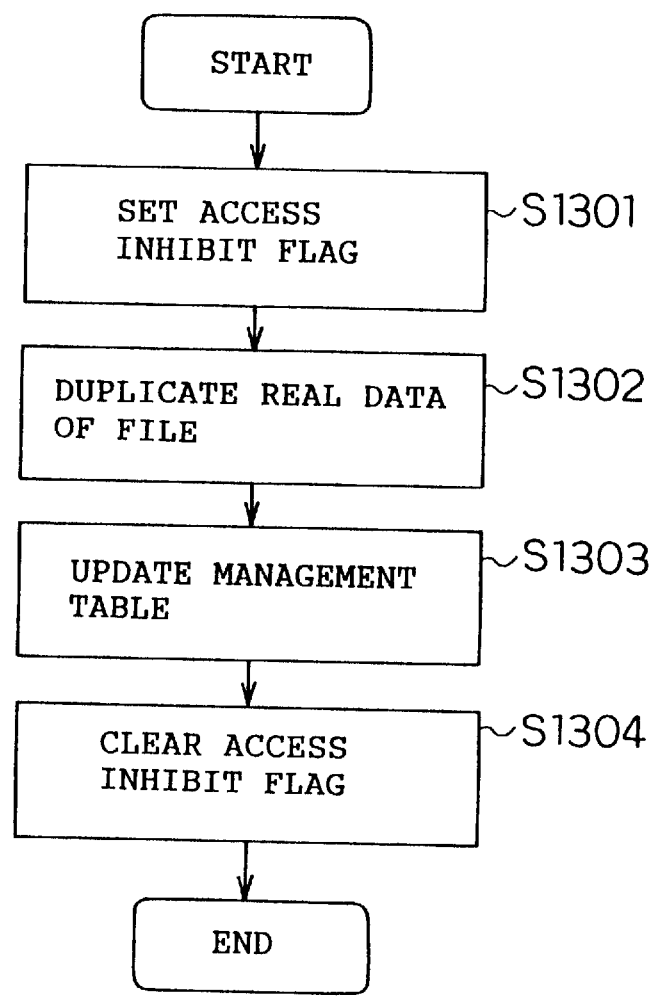
FIG. 13 is a flowchart illustrating a processing flow in a file move processing section according to the fourth embodiment.

FIG. 13 is a flowchart illustrating the processing flow in the file move processing section 1203 when moving real data of a file between the server computers. First, the file move processing section 1203 sets the access inhibit flag in the management table 1201 for the virtual file identifier of the file to be moved (step S1301). Next, the real data of the file is copied from the source server computer to the destination server computer (step S1302). Next, the server computer name and real file identifier corresponding to the original virtual file identifier in the management table 1201 are changed to the destination server computer name and the real file identifier in the destination server computer (step S1303). Finally, the access inhibit flag corresponding to the original virtual file identifier in the management table 1201 is reset (step S1304). In this way, the real data of the file corresponding to the virtual file identifier is moved between the server computers.

Figure 14:
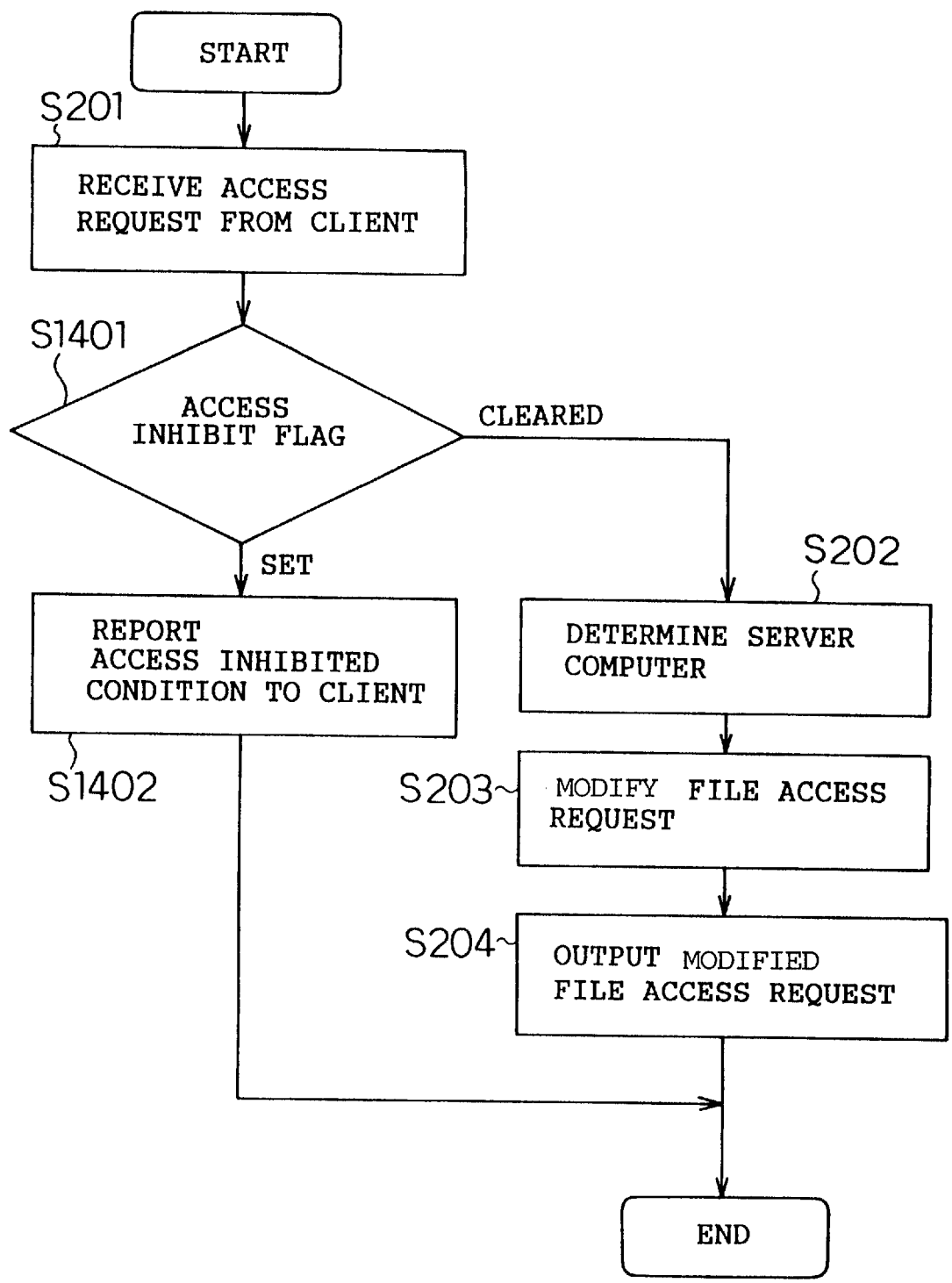
FIG. 14 is a flowchart illustrating a processing flow when a file access is requested according to the fourth embodiment.

FIG. 14 is a flowchart illustrating the processing flow in the virtual file management apparatus 102 when a file access request is received from a client computer. First, the receiving section 107 receives the file access request from the client computer 109a (step S201). Next, the preprocessing section 1202 checks the access inhibit flag, in the management table 1201, corresponding to the virtual file identifier contained in the received file access request (step S1401). If the access inhibit flag is set, the preprocessing section 1202 creates data indicating that the access is inhibited, and instructs the transmitting section 108 to transmit the data to the client computer. The transmitting section 108 thus instructed transmits the data indicating that the access is inhibited, to the client computer (step S1402). On the other hand, if, in step S1401, the access inhibit flag is not set, the process from step S202 onward in FIG. 2 is carried out as in the first embodiment.

Next, a specific example of how this embodiment is used will be described. As in the first embodiment, in FIG. 12, there are two files with virtual file identifiers V_001 and V_002 accessible from the client computers; the virtual file identifier V_001 corresponds to a real file identifier FILE_A existing in the file system 104a in the server computer 101a and the virtual file identifier V_002 corresponds to a real file identifier FILE_B existing in the file system 104b in the server computer 101b.

In this case, the contents of the management table 1201 managed by the virtual file management apparatus 102 in the server computer 101a, when file move operations are not being performed, are as shown in FIG. 15. At this time, if the real data of the virtual file identifier V_001 is to be moved from the server computer 101a to the server computer 101b, first in step S1301 the file move processing section 1203 sets the access inhibit flag in the management table 1201, as shown in FIG. 16. Next, in step S1302, the real data of the file designated by the virtual file identifier V_001 is copied from FILE_A in the file system 104a in the server computer 101a to the file system 104b in the server computer 101b. Next, in step S1303, the contents of the management table 1201 are changed as shown in FIG. 17. That is, the server identifier is changed to the destination server computer name 101b, and the real file identifier is changed to the new real file identifier FILE_A2 obtained by querying the file system 104b in the destination server computer 101b about the real file identifier of the file copied in step S1302. Finally, in step S1304, the access inhibit flag for the virtual file identifier V_001 is cleared. The contents of the management table 1201 are now as shown in FIG. 18. In this way, the real data of a file can be moved from one server computer to another without changing its virtual file identifier that is to be used when issuing an access request from a client computer.

On the other hand, when the access inhibit flag is set, if a file access request with the virtual file identifier V_001 is issued from the client computer 109b, first the receiving section 107 receives the access request in step S201. Next, in step S1401, the preprocessing section 1202 refers to the management table 1201 to check the status of the access inhibit flag for the virtual file identifier V_001 contained in the access request. In this case, since the access inhibit flag is set, step S1402 is carried out. In step S1402, the preprocessing section 1202 creates data indicating that the access is inhibited, and instructs the transmitting section 108 to transmit the data to the client computer 109b. The transmitting section 108 thus instructed transmits the data indicating that the access is inhibited, to the client computer 109b. On the other hand, if the file move operation is completed and the access inhibit flag is cleared, the process from step S202 onward is carried out as in the first embodiment, allowing the client computer 109b to access the file by using the same virtual file identifier as that used before the real data was moved between the server computers. That is, the client computer need not be aware of the movement of the real data between the server computers.

Next, a virtual file management system according to a fifth embodiment of the present invention will be described with reference to relevant drawings. This embodiment corresponds to the invention described in claim 6.

Figure 19:
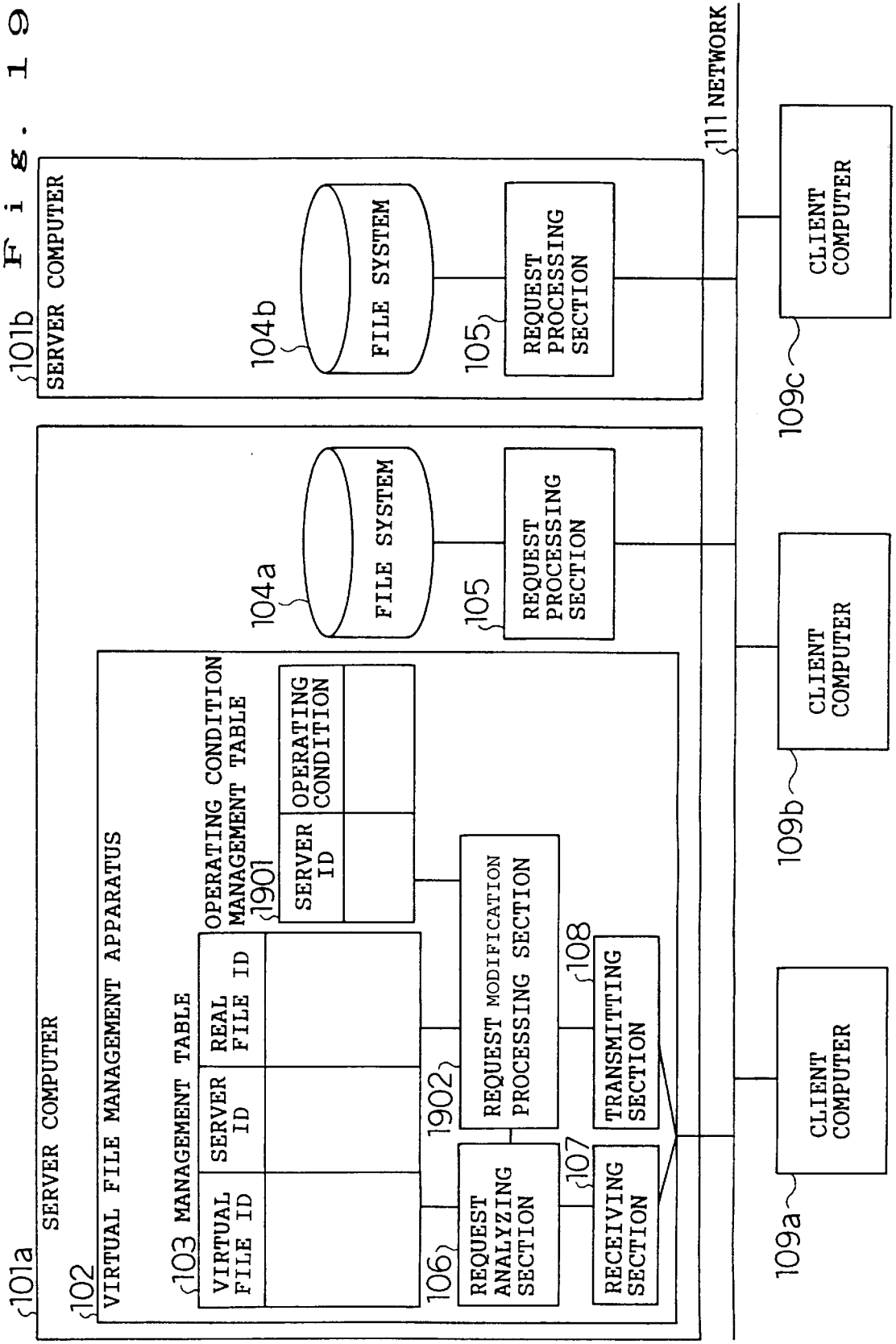
FIG. 19 is a block diagram of a virtual file management system according to a fifth embodiment of the present invention.

FIG. 19 is a block diagram showing the virtual file management system according to the fifth embodiment of the present invention. In FIG. 19, reference numerals 101a and 101b are server computers; 102 is a virtual file management apparatus operating in the server computer 101a; 103 is a management table; 104a and 104b are file systems which are managed within the server computers 101a and 101b, respectively; 105 is a request processing section; 106 is a request analyzing section; 107 is a receiving section; 108 is a transmitting section; 1901 is an operating condition management table; 109a, 109b, and 109c are client computers; 1902 is a request modification processing section which checks the operating condition management table 1901 and selectively determines whether to transfer a request to the server computer where real data of a file is stored; and 111 is a network through which the client computers 109a, 109b, and 109c are connected to the server computers 101a and 101b.

The thus constructed virtual file management system will be described below, dealing with the difference in operation from the first embodiment.

The difference from the first embodiment lies in the operation of the request modification processing section 1902. While, in the first embodiment, the request modification processing section 1902 is called in step S203 in FIG. 2, in the present embodiment the request modification processing section 1902 first checks the operating condition management table 1901 to determine whether the server computer 101a or 101b identified by the request analyzing section 106 is operating or not. If the identified server computer is not operating, the request modification processing section 1902 instructs the transmitting section 108 to transmit data indicating that the server is not operating, to the client computer 109a; on the other hand, if the server computer is operating, the request modification processing section 1902 modifies the file access request into a file access request such that the server computer can directly respond to the client computer 109a, by using data in the management table 103, and instructs the transmitting section 108 to transmit the modified file access request to the server computer 101a or 101b, as in the first embodiment. In this way, when the server computer holding the real data of the requested file is not operating, the non-operating condition is reported to the client computer. Without this function, when there was no response to a file access request, the client computer could not judge whether the server computer where the virtual file management apparatus should be operating is not operating or the server computer holding the real data of the file is not operating.

Next, a specific example of how this embodiment is used will be described. As in the first embodiment, in FIG. 19, there are two files with virtual file identifiers V_001 and V_002 accessible from the client computers; the virtual file identifier V_001 corresponds to a real file identifier FILE_A existing in the file system 104a in the server computer 101a and the virtual file identifier V_002 corresponds to a real file identifier FILE_B existing in the file system 104b in the server computer 101b. In this case, the contents of the management table 103 managed by the virtual file management apparatus 102 in the server computer 101a are as shown in FIG. 3. When the server computer 101b is not operating, the contents of the operating condition management table 1901 are as shown in FIG. 20.

At this time, when a file access request with the virtual file identifier V_002 is issued from the client computer 109a, the processing in steps S201 and S202 described in the first embodiment is carried out. In step S203, the request modification processing section 1902 checks the contents of the operating condition management table 1901 shown in FIG.

20, as earlier described, and since the server computer 101b is not operating, instructs the transmitting section 108 to transmit the data indicating that the server 101b is not operating. The transmitting section 108 thus transmits the data indicating that the server 101b is not operating, to the client computer 109a. On the other hand, if a file access request with the virtual file identifier V_001 is issued, since the server computer 101a is operating, the same operation as described in the first embodiment is performed.

Next, a virtual file management system according to a sixth embodiment of the present invention will be described with reference to relevant drawings. This embodiment corresponds to the invention described in claim 7.

FIG. 21 is a block diagram showing the virtual file management system according to the sixth embodiment of the present invention. In FIG. 21, reference numerals 2101a and 2101b are server computers; 2106a and 2106b are file systems which are managed within the server computers 2101a and 2101b, respectively; 2102a is a file identifier list for the files stored in the file system 2106a managed in the server computer 2101a; 2102b is a file identifier list for the files stored in the file system 2106b managed in the server computer 2101b; 2103 is a request processing section; 2104 is an access request monitoring section; 2105 is a transmitting section; 2107a and 2107b are client computers; and 111 is a network through which the client computers, 2107a and 2107b, and the server computers, 2101a and 2101b, are connected.

The operation of the thus constructed virtual file management system will be described below with reference to relevant drawings.

Figure 22:
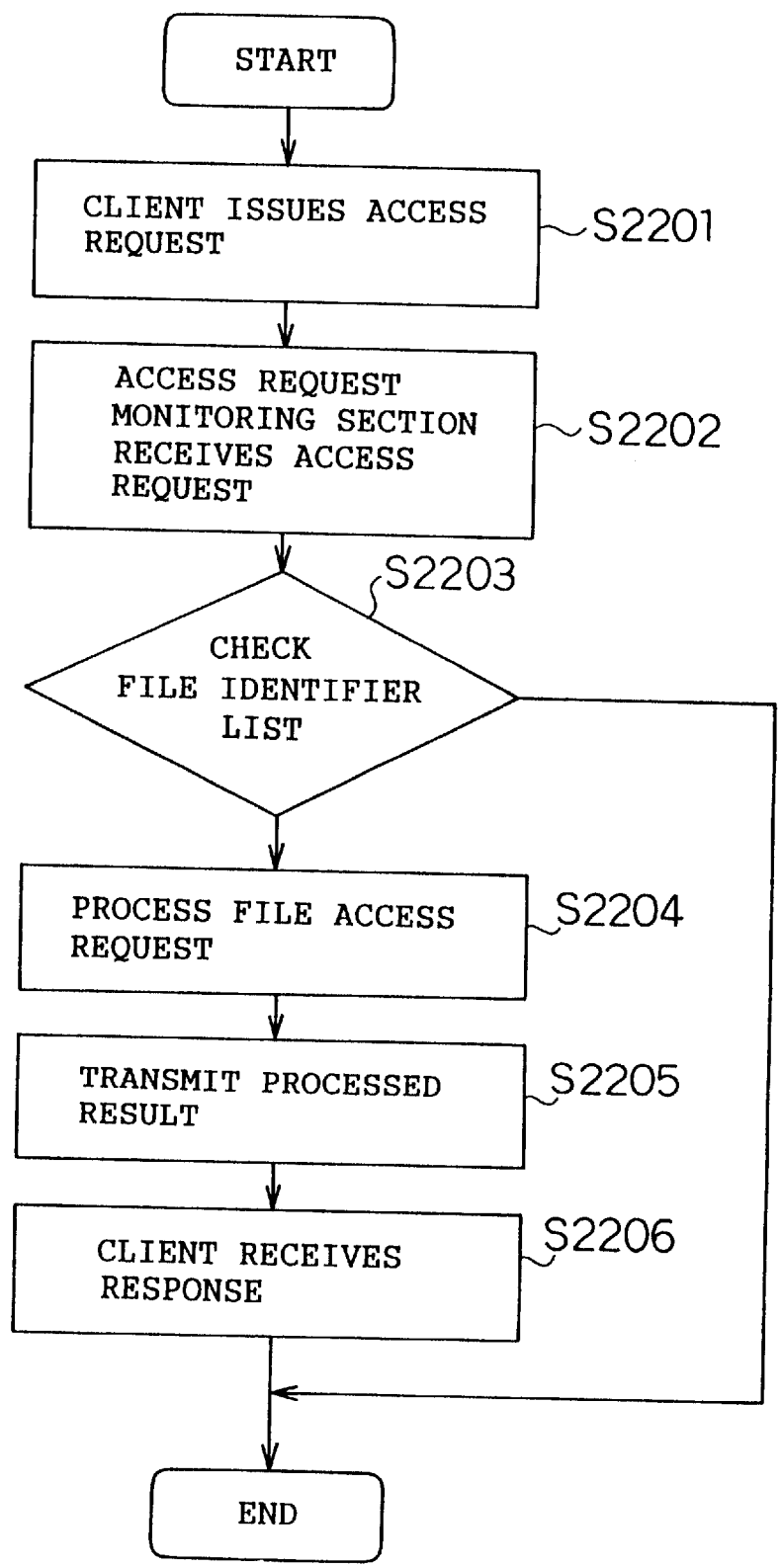
FIG. 22 is a flowchart illustrating a processing flow according to the sixth embodiment.
Figure 31:
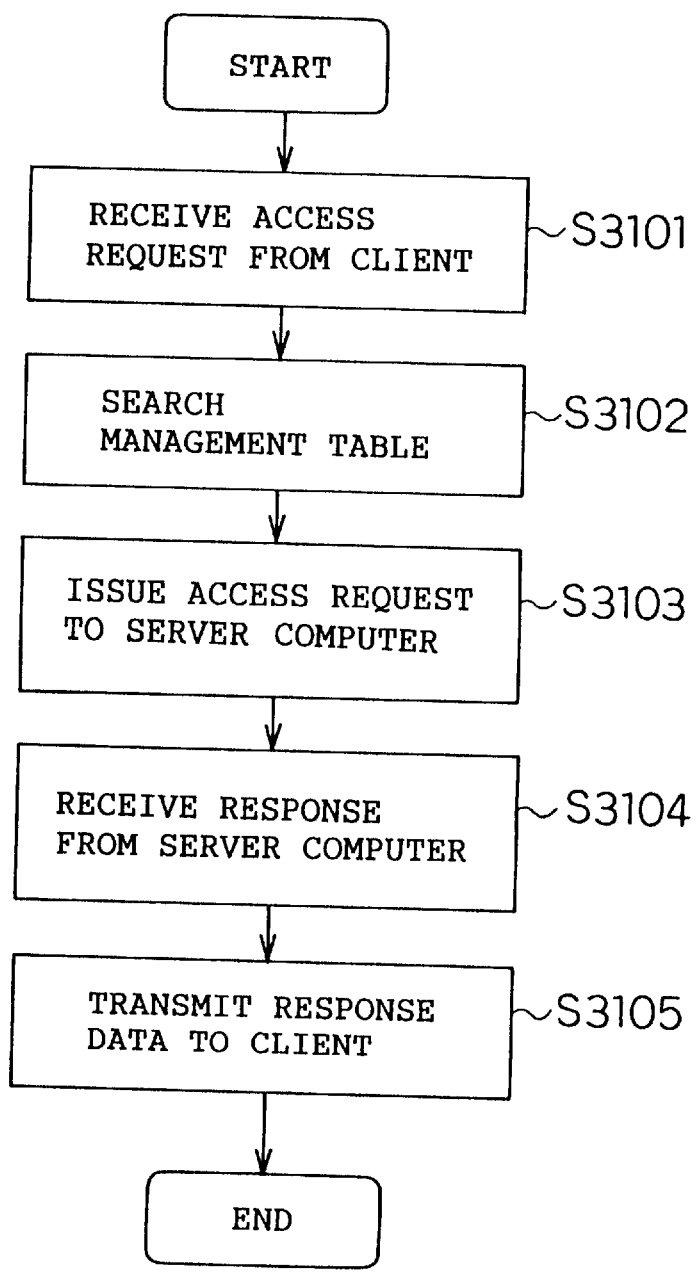
FIG. 31 is a flowchart illustrating the operation of the same prior art.

FIG. 22 is a flowchart illustrating the general flow in the virtual file management system when a client computer accesses a file stored on a server computer. First, the client computer 2107a or 2107b issues a file access request to a predetermined virtual server computer which is neither the server computer 2101a nor the server computer 2101b (step S2201). This file access request is received by the access request monitoring section 2104 in each of the server computers 2101a and 2101b (step S2202). The access request monitoring section 2104 then analyzes the received file access request, and checks whether or not the file identifier contained in the file access request is stored in the file identifier list 2102a or 2102b in its own server computer. The file access request is passed to the request processing section 2103 only when the file identifier is stored in the file identifier list. If the file identifier is not stored in the file identifier list 2102a or 2102b, the process is terminated here (step S2203). If the file identifier is stored in the file identifier list 2102a or 2102b, the file access request is processed, and the transmitting section 2105 is instructed to transmit the processed result to the client computer 2107a or 2107b (step S2204). The transmitting section 2105 thus transmits the processed result to the client computer 2107a or 2107b (step S2205). Finally, the client computer 2107a or 2107b receives the response to the access request (step S2206).

A specific example of how this embodiment is used will be described next. In FIG. 21, in the file system 2106a of the server computer 2101a there are three files with file identifiers FILE_A, FILE_B, and FILE_C which can be accessed from the client computers, while in the file system 2106b of the server computer 2101b there are two files with file identifiers FILE_D and FILE_E which can be accessed from the client computers. The contents of the file identifier list 2102a in the server computer 2101a are as shown in FIG. 23, and the contents of the file identifier list 2102b in the server computer 2101b are as shown in FIG. 24. In this situation, the processing flow will be described with reference to the flowchart of FIG. 22 when a file access request for FILE_D such as shown in FIG. 25, is issued from the client computer 2107b to the predetermined virtual server computer.

First, in step S2201, the client computer 2107b issues an access request such as shown in FIG. 25 to the virtual server computer V_SERVER. In step S2202, the access request monitoring section 2104 in each of the server computers 2101a and 2101b receives the file access request. Next, in step S2203, the access request monitoring section 2104 of the server computer 2101a checks whether FILE_D is carried in the file identifier list 2102a shown in FIG. 23; since FILE_D is not there, the process is terminated. Likewise, in step S2203, the access request monitoring section 2104 of the server computer 2101b checks whether FILE_D is carried in the file identifier list 2102b shown in FIG. 24; since FILE_D is found there, the file access request of FIG. 25 is passed to the request processing section 2103. Next, in step S2204, the request processing section 2103 processes the file access request, reads the real data of the file identifier FILE_D from the file system 2106b, and instructs the transmitting section 2105 to transmit the data to the client computer 2107b. Thus, in step S2205, the transmitting section 2105 of the server computer 2101b transmits the data to the client computer 2107b. Finally, in step S2206, the client computer 2107b receives the response. In this way, the client computer can receive the response to the file access request issued to the virtual server computer.

Next, a virtual file management system according to a seventh embodiment of the present invention will be described with reference to relevant drawings. This embodiment corresponds to the invention described in claim 8.

FIG. 26 is a block diagram showing the virtual file management system according to the seventh embodiment of the present invention. In FIG. 26, reference numeral 2601 is a master file identifier list, 2602 is an identifier creation section, 2603 is a server selection section, 2604 is a file creation section, 2605 is a master list updating section, and 2606 is a list updating section which updates the file identifier list 2102a or 2102b in the server computer 2101a or 2101b, respectively; the other component elements are the same as those described in connection with FIG. 21 in the description of the sixth embodiment.

When creating a new file to be managed by the virtual server computer, a server computer where the real data of the file should be stored must be selected. To achieve this, in the present embodiment, one of the server computers acts as a master server computer to determine in which server computer the file should be created.

The operation of the present embodiment, when creating a new file, will be described below. First, when a new file creation request is issued to the master server computer 2101a, the identifier creation section 2602 creates a new file identifier not yet existing in the master file identifier list 2601. Next, in accordance with a predetermined method the server selection section 2603 selects one server computer from among the server computers 2101a and 2101b connected to the network 111, and supplies the name of the selected server computer to the file creation section 2604. The file creation section 2604 instructs the server computer 2101a or 2101b, whichever is selected by the server selection section 2603, to create the file with the file identifier created by the identifier creation section 2602. The master list updating section 2605 newly adds the file identifier created by the identifier creation section 2602 to the master file identifier list 2601. On the other hand, the server computer 2101a or 2101b, whichever is instructed to create the file with the file identifier created by the identifier creation section 2602, creates the file in its file system 2106a or 2106b, following which the list updating section 2606 newly adds the file identifier created by the identifier creation section 2602 to the file identifier list 2102a or 2102b. In this way, a new file to be managed by the virtual server computer can be added.

A specific example of how this embodiment is used will be described next. As in the foregoing sixth embodiment, in FIG. 26, in the file system 2106a of the server computer 2101a there are three files with file identifiers FILE__A, FILE__B, and FILE__C which can be accessed from the client computers, while in the file system 2106b of the server computer 2101b there are two files with file identifiers FILE__D and FILE__E which can be accessed from the client computers. The contents of the file identifier list 2102a in the server computer 2101a are as shown in FIG. 23, and the contents of the file identifier list 2102b in the server computer 2101b are as shown in FIG. 24. Further, the contents of the master file identifier list 2601 are as shown in FIG. 27.

In this situation, when an instruction to create a new file in the virtual server computer is given to the master server computer 2101a, first the identifier creation section 2602 creates a file identifier FILE__F not yet existing in the master file identifier list 2601. Next, the server selection section 2603 queries the server computers 2101a and 2101b connected to the network 111 about the number of files stored in their respective file systems 2106a and 2106b, and selects the server computer 2101b that stores the fewer files. The result of the selection is given to the file creation section 2604. The file creation section 2604 instructs the server computer 2101b to create the file with the file identifier FILE__F. The server computer 2101b creates the file in its file system 2106b, and the list updating section 2606 adds FILE__F to the file identifier list 2102b. Finally, the master list updating section 2605 adds FILE__F to the master file identifier list 2601. The contents of the master file identifier list 2601 are now as shown in FIG. 28. The contents of the file identifier list 2102b in the server computer 2101b at this time are shown in FIG. 29. In this way, the master file identifier list is automatically constructed. The files whose identifiers are stored in the thus constructed master file identifier list can be accessed from the client computers in the same manner as described in the sixth embodiment.

Next, a virtual file management system according to an eighth embodiment of the present invention will be described with reference to relevant drawings. This embodiment corresponds to the invention described in claim 9.

Figure 33:
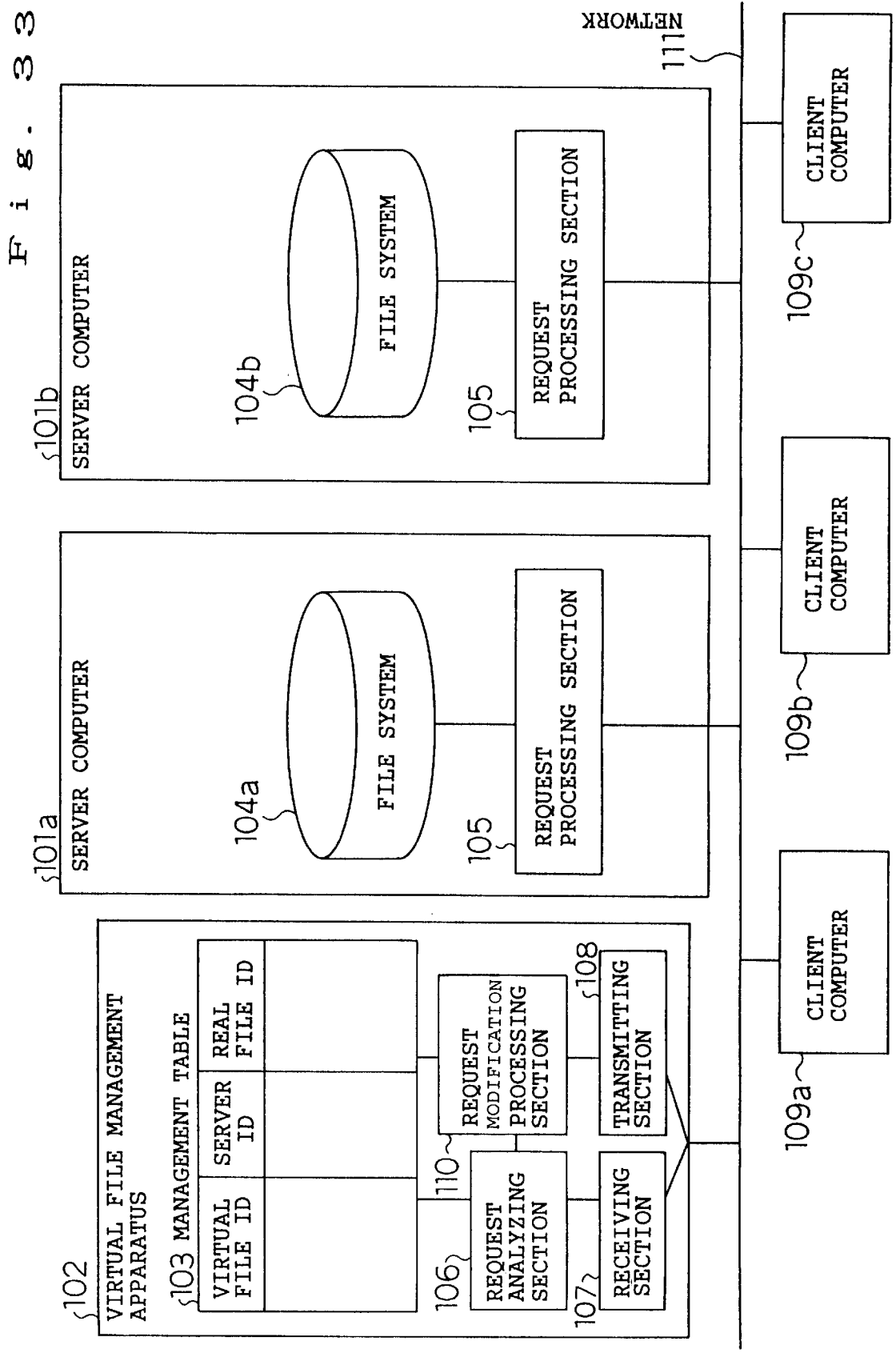
FIG. 33 is a block diagram of a virtual file management system according to an eighth embodiment of the present invention.

FIG. 33 is a block diagram showing the virtual file management system according to the eighth embodiment of the present invention. The difference of this embodiment from the virtual file management system of the first embodiment shown in FIG. 1 is that, while in FIG. 1 the virtual file management apparatus 102 is provided within the server computer 101a, in the present embodiment the virtual file management apparatus 102 is connected to the network 111, independently of the server computer. The configuration and operation of the virtual file management apparatus 102 are fundamentally the same as the one shown in FIG. 1; since the description is already given in connection with the first embodiment, the description will not be repeated here.

In the above embodiment, the selection of the server computer was made based on the number of files stored in its file system, but various other methods can be considered for server computer selection algorithms, such as methods based on the capacity of the file system, the processing speed of the server computer, the degree of workload concentration, etc.

It will also be recognized that the means and sections in the present invention may be wholly or partly implemented in software using a computer or in hardware using dedicated hardware circuits.

In the case of software implementation, all or part of the necessary programs for implementation can be provided on a floppy disk or a CD-ROM.

Next, a virtual file management system according to a ninth embodiment of the present invention will be described with reference to relevant drawings.

Figure 34:
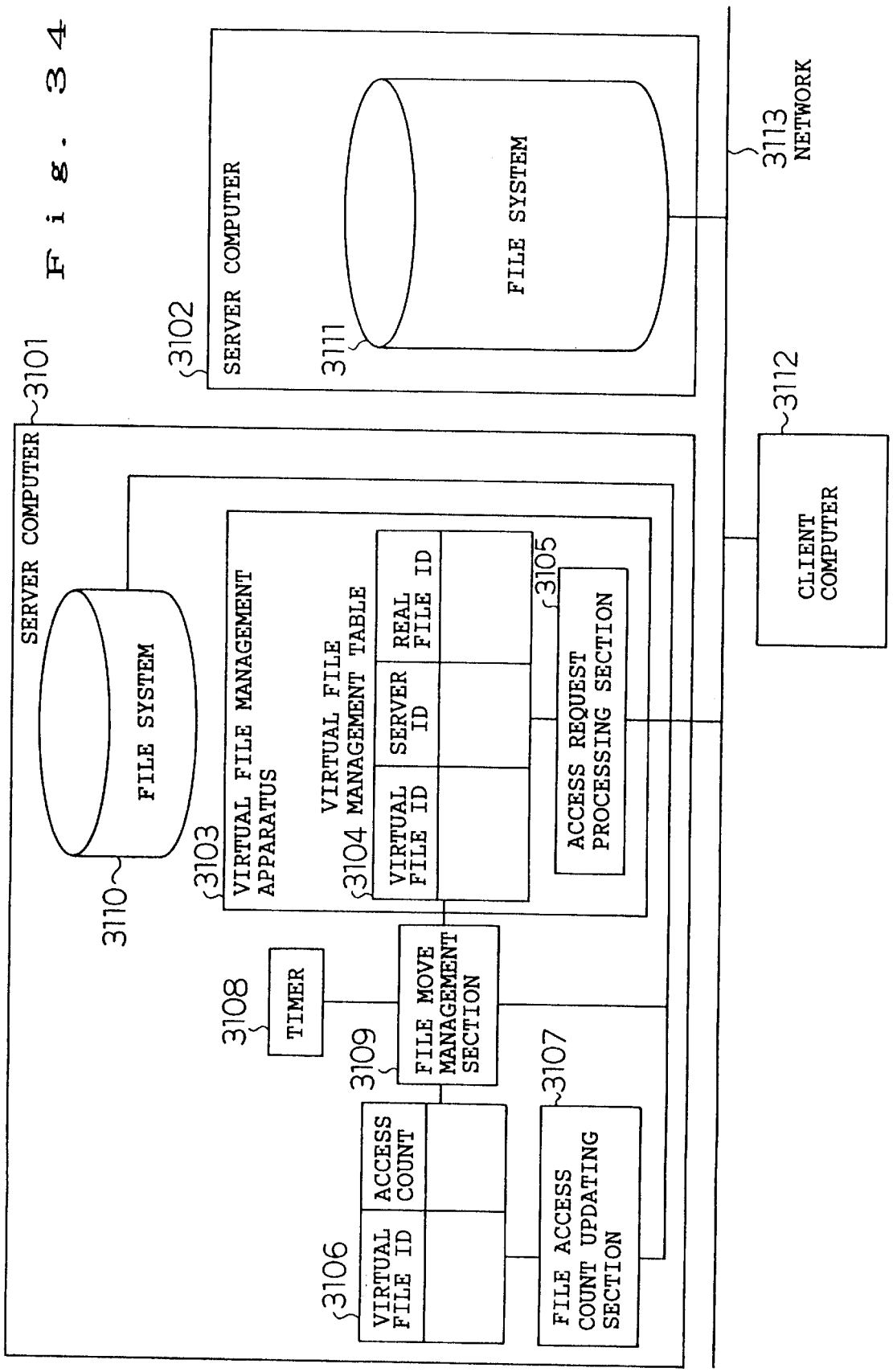
FIG. 34 is a block diagram of a virtual file management system according to a ninth embodiment of the present invention.

FIG. 34 is a block diagram showing the virtual file management system according to the ninth embodiment of the present invention. The configuration of this embodiment will be described with reference to the same figure.

In FIG. 34, reference numerals 3101 and 3102 are server computers; 3103 is a virtual file management apparatus operating in the server computer 3101; 3104 is a virtual file management table; 3105 is an access request processing section; 3106 is a file access table; 3107 is a file access count updating section; 3108 is a timer; 3109 is a file move management section; 3110 and 3111 are file systems which are managed within the server computers 3101 and 3102, respectively; 3112 is a client computer; and 3113 is a network through which the client computer 3112 is connected to the server computers 3101 and 3102. Request frequency storage means of the present invention includes the file access table 3106 and the file access count updating section 3107. File move control means of the present invention corresponds to the file move management section 3109.

The operation of the thus constructed virtual file management system will be described below with reference to relevant drawings.

Figure 35:
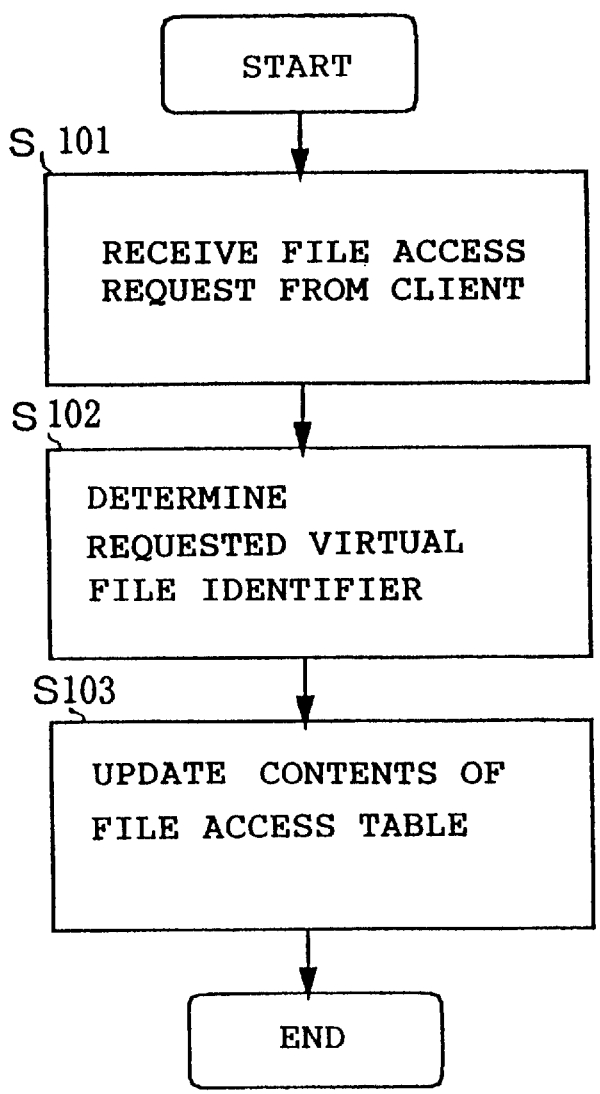
FIG. 35 is a flowchart illustrating a processing flow in a file access count updating section according to the ninth embodiment.

First, the operation in the file access count updating section 3107 will be described, taking a case when a file access request from the client computer 3112 occurs in the server computer 3101 where the virtual file management apparatus 3103 is operating. FIG. 35 is a flowchart illustrating the processing flow in the file access count updating section 3107.

When a file access request is issued from the client computer 3112 to the server computer 3101, the file access count updating section 3107 and the access request processing section 3105 receive the file access request (step S101). The access count updating section 3107 determines which virtual file identifier is access-requested from the received file access request (step S102), and updates the access count value in the file access table 3106 for the thus determined virtual file identifier (step S103).

On the other hand, the access request processing section 3105 which received the same file access request checks the virtual file management table 3104, modifies the file access request so as to respond to the client computer 3112, and transfers the modified file access request to the server computer where the real data of the virtual file identifier requested in the file access request is stored, as described in connection with the first embodiment. The server computer that received the modified file access request transmits the response data to the client computer 3112 which thus obtains the response to the file access request it issued.

Figure 36:
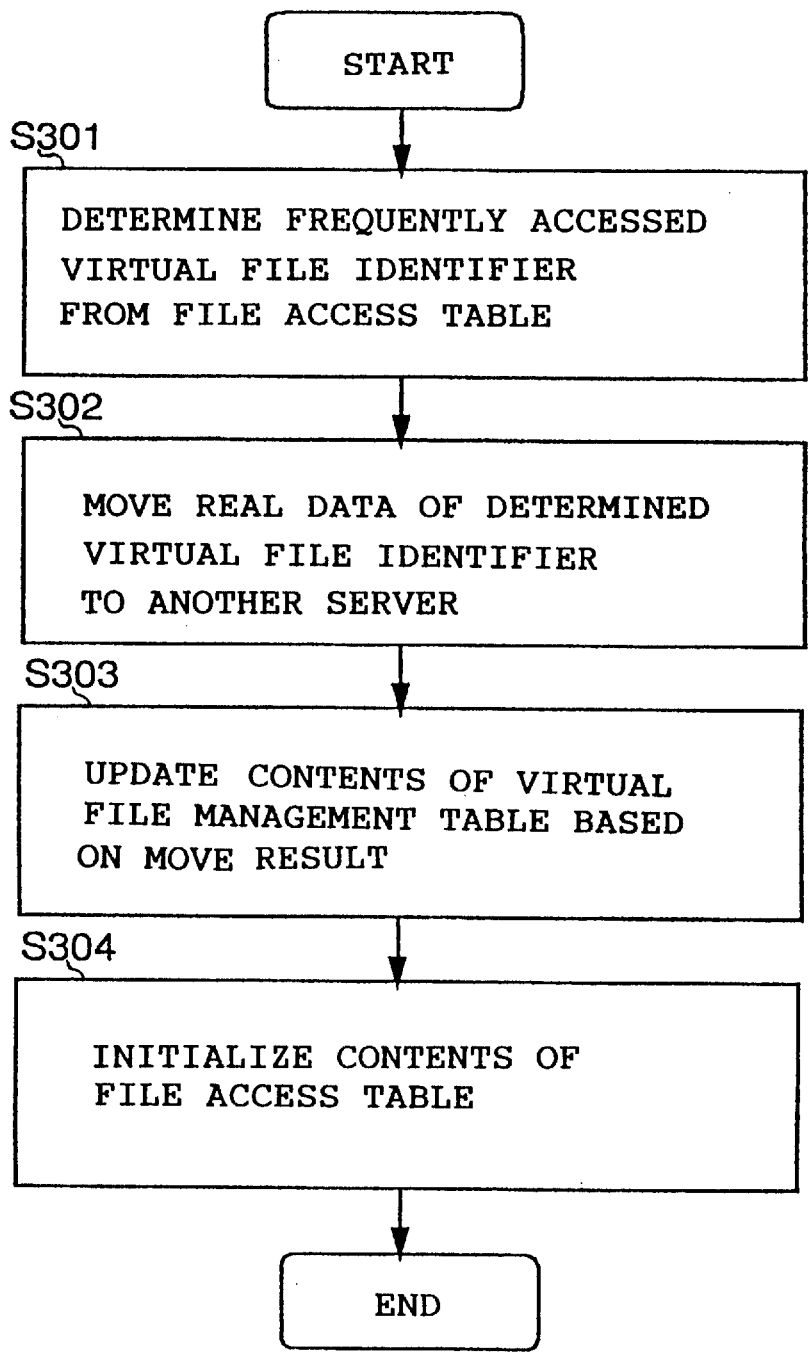
FIG. 36 is a flowchart illustrating a processing flow in a file move management section according to the ninth embodiment.

Next, the operation of the file move management section 3109 activated by the timer 3108 will be described. FIG. 36 is a flowchart illustrating the processing flow in the file move management section 3109.

When the file move management section 3109 is activated by the timer 3108 at a predetermined time interval, the file move management section 3109 checks the file access table 3106 and determines a frequently accessed virtual file identifier (step S301). Then, the real data corresponding to the thus determined virtual file identifier is moved from the server computer where it is stored to another server computer (step S302); then, the contents of the virtual file management table 3104 for that virtual file identifier are changed to indicate the real file identifier in the destination server computer and the destination server identifier (step S303), and finally, the file access table 3106 is initialized (step S304).

In this way, when there occurs a file access request from the client computer 3112, the file access table 3106 is updated by the file access count updating section 3107, and the file move management section 3109 which is activated by the timer 3108 at predetermined intervals of time checks the contents of the file access table 3106 so that the real data corresponding to the frequently accessed virtual file identifier can be moved to another server computer.

A specific example of how this embodiment is used will be described next.

Suppose a case where a file access request (see FIG. 39) designating a virtual file identifier V_002 is issued from the client computer 3112 to the server computer 3101 when the contents of the virtual file management table 3104 in the server computer 3101 are as shown in FIG. 37(*a*) and the contents of the file access table 3106 are as shown in FIG. 38(*a*). The operation of the file access count updating section 3107 in this case will be described with reference to the flowchart of FIG. 35.

First, in step S101, the file access request of FIG. 39 is received. Next, in step S102, it is determined from the file access request that the request is for the virtual file identifier V_002. Finally, in step S103, the number of accesses to the virtual file identifier V_002 in the file access table 3106 is increased by 1, thus updating the contents of the file access table 3106 from those shown in FIG. 38(*a*) to those shown in FIG. 38(*b*).

Now, when the contents of the file access table 3106 are as shown in FIG. 38(*b*), the operation of the file move management section 3109 activated by the timer 3108 will be described with reference to the flowchart of FIG. 36.

First, in step S301, the most frequently accessed virtual file identifier V_001 is determined from the file access table 3106. Next, in step S302, the real data corresponding to the virtual file identifier V_001, whose real file identifier FILE_101A is stored in the server computer 3101, is moved to the other server computer 3102. When the real identifier of the real data moved to the server computer 3102 becomes FILE_102C as a result of the move, then in step S303 the contents of the virtual file management table 3104 are updated from those shown in FIG. 37(*a*) to those shown in FIG. 37(*b*). Finally, in step S304, the file access table 3106 is initialized as shown in FIG. 38(*c*).

In this way, a file with a high frequency of access can be identified and moved effectively to distribute the workload. This means that, as described in the specific example of this embodiment, when access requests are made for the same file within a predetermined period of time after the file is moved, the file access requests concentrated on the server computer 3101 are distributed between the server computers 3101 and 3102.

The present embodiment has dealt with a system having two server computers, but the number is not limited to two. For example, when there are three or more server computers, the same effect as described above can be obtained. In that case, however, it becomes necessary to determine to which server computer the file should be moved. The server selection can be accomplished in various ways, for example, by selecting a server computer having the largest space available in the file system or by selecting a server computer where the number of files stored in the file system is the smallest.

In step S301, the file move management section 3109 may determine two or more virtual file identifiers to select two or more files to be moved. There is also a possibility that no files are selected and no file move operations are performed.

Further, in step S304 illustrating the operation of the file move management section 3109, the contents of the file access table 3106 were all initialized to 0 in the above example, but to prevent successive moves, the initialization may be performed by appropriately weighting the access count of the virtual file identifier whose real data was moved.

In the above description, the file access count updating section 3105 updates the file access table 3106 when an access request for file read occurs. Alternatively, the file access table 3106 may be updated regardless of the type of file access request or by selecting a particular type of file access request.

Next, a virtual file management system according to a 10th embodiment of the present invention will be described with reference to relevant drawings.

Figure 40:
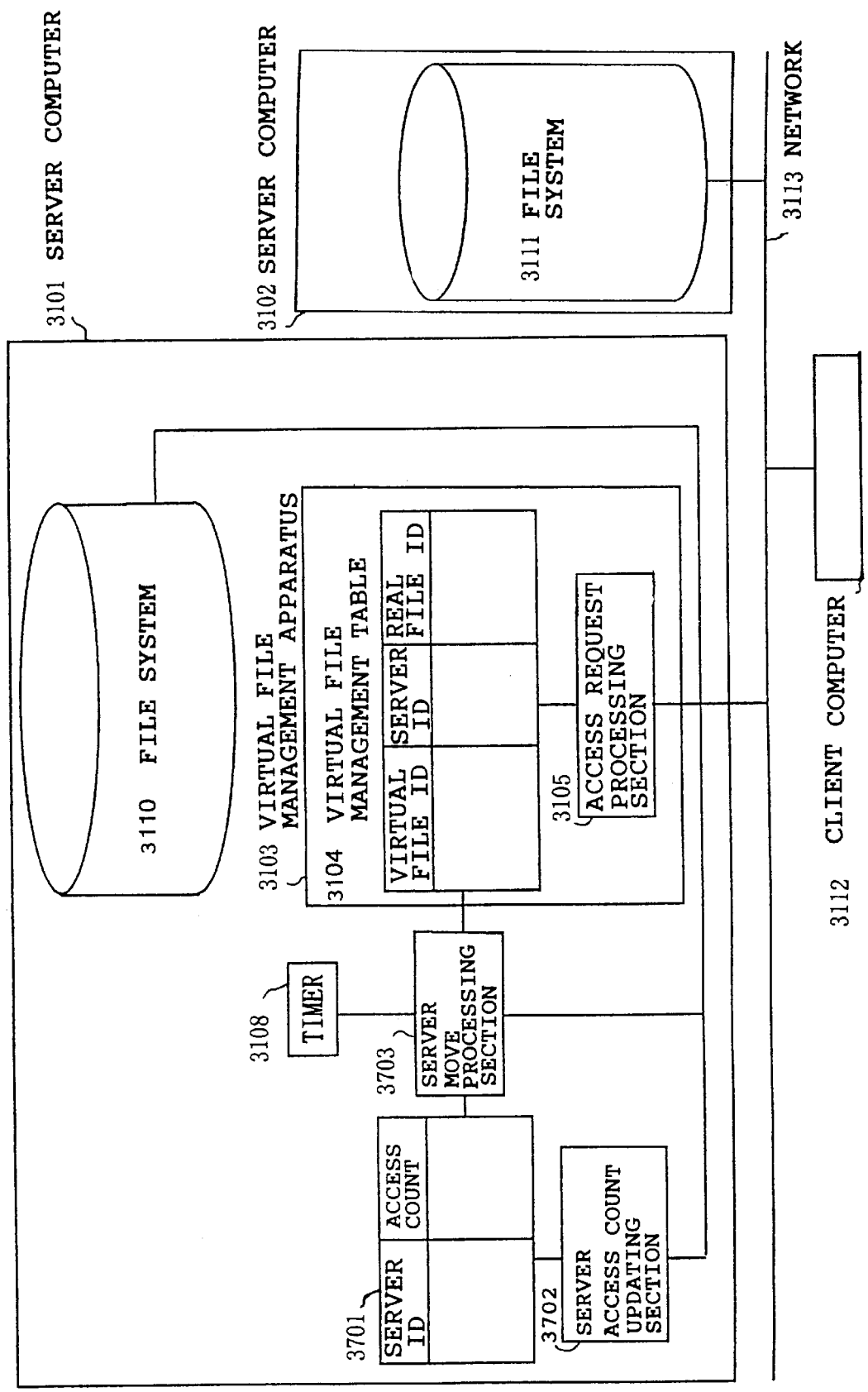
FIG. 40 is a block diagram of a virtual file management system according to a 10th embodiment of the present invention.

FIG. 40 is a block diagram showing the virtual file management system according to the 10th embodiment of the present invention. In FIG. 40, reference numeral 3701 is a server access table, 3702 is a server access count updating section, and 3703 is a server move management section; the other component elements are the same as those described in connection with FIG. 34 in the description of the ninth embodiment.

The operation of the thus constructed virtual file management system will be described below with reference to relevant drawings.

Figure 41:
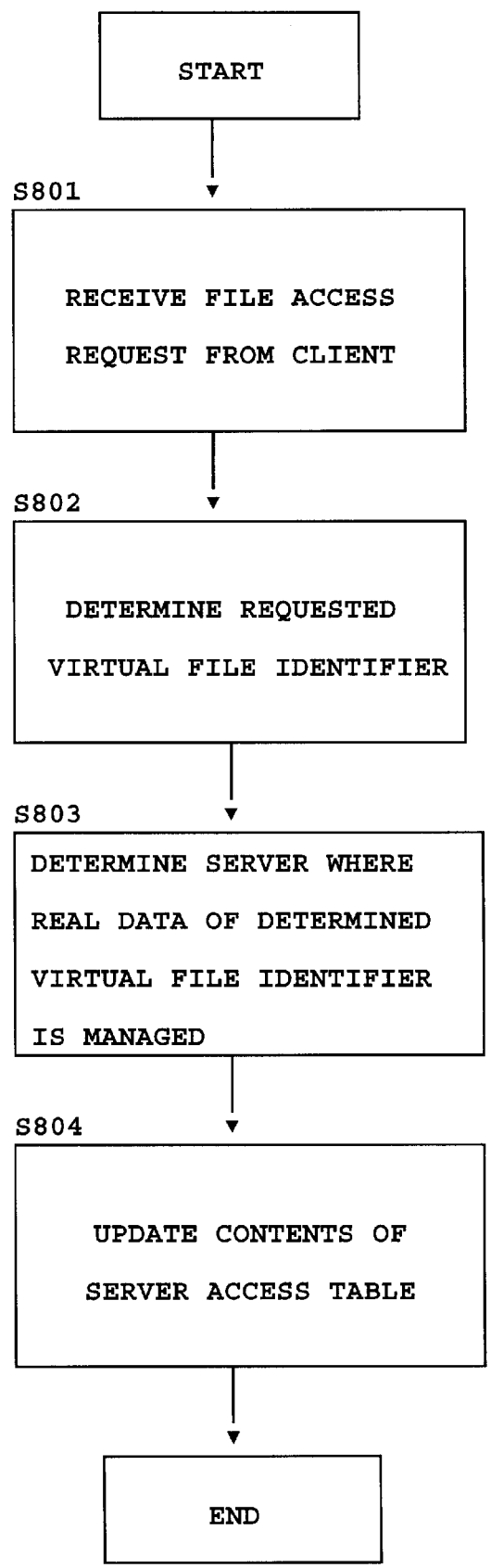
FIG. 41 is a flowchart illustrating a processing flow in a server access count updating section according to the 10th embodiment.

First, the operation in the server access count updating section 3702 will be described, taking a case when a file access request from the client computer 3112 occurs in the server computer 3101 where the virtual file management apparatus 3103 is operating. FIG. 41 is a flowchart illustrating the processing flow in the server access count updating section 3702.

When a file access request is issued from the client computer 3112 to the server computer 3101, the server access count updating section 3702 receives the file access request, similarly to the ninth embodiment (step S801).

Next, the server access count updating section 3702 determines which virtual file identifier is access-requested from the received file access request (step S802), and checks the virtual file management table 3104 to determine the server where the real data designated by the above-determined virtual file identifier is stored (step S803). Then, the access count value in the server access table 3701 for the thus determined server identifier is updated (step S804).

Figure 42:
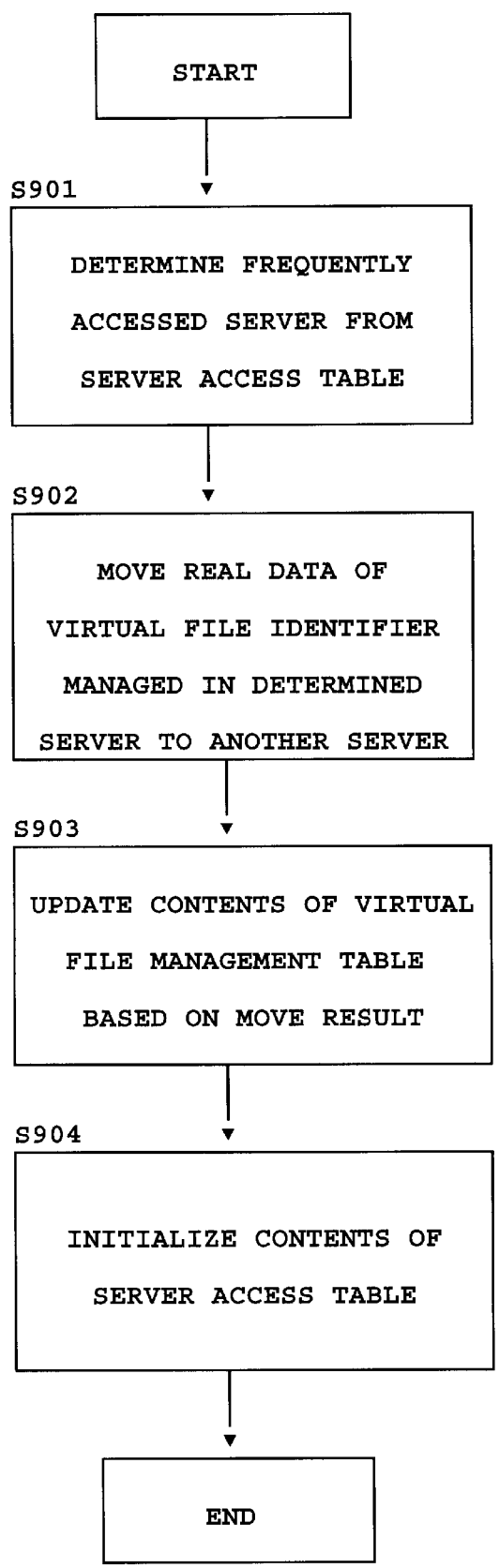
FIG. 42 is a flowchart illustrating a processing flow in a server move management section according to the 10th embodiment.

The operation of the server move management section 3703 activated by the timer 3108 will be described next. FIG. 42 is a flowchart illustrating the processing flow in the server move management section 3703.

When the server move management section 3703 is activated by the timer 3108 at a predetermined time interval, the server move management section 3703 checks the server access table 3701 and determines the server identifier of a frequently accessed server (step S901). Then, the virtual file management table 3104 is checked, and the real data corresponding to the virtual file identifier and managed in the server computer identified with the determined server identifier is moved from the server computer where the data is stored, to another server computer (step S902); then, the contents of the virtual file management table 3104 for the thus moved virtual file identifier are changed to indicate the real file identifier in the destination server computer and the destination server identifier (step S903), and finally, the server access table 3701 is initialized (step S904).

In this way, when there occurs a file access request from the client computer 3112, the server access table 3701 is updated by the server access count updating section 3702, and the server move management section 3703 which is activated by the timer 3108 at predetermined intervals of time checks the contents of the server access table 3701 so that the real data corresponding to the virtual file identifier and managed in the server computer identified with the frequently accessed server identifier can be moved to another server computer.

A specific example of how this embodiment is used will be described next.

Here, similarly to the description of the ninth embodiment, suppose a case where a file access request (see FIG. 39) designating a virtual file identifier V__002 is issued from the client computer 3112 to the server computer 3101 when the contents of the virtual file management table 3104 in the server computer 3101 are as shown in FIG. 37(a) and the contents of the server access table 3701 are as shown in FIG. 43(a). The operation of the server access count updating section 3702 in this case will be described with reference to FIG. 41.

First, in step S801, the file access request of FIG. 39 is received. Next, in step S802, it is determined from the file access request that the request is for the virtual file identifier V__002. In step S803, the virtual file management table 3104 of FIG. 37(a) is checked, to determine that the real data designated by the above-determined virtual file identifier V__002 is stored in the server computer identified with the server identifier 101. Finally, in step S804, the number of accesses to the server identifier 101 in the server access table 3701 is increased by 1, thus updating the contents of the server access table 3701 from those shown in FIG. 43(a) to those shown in FIG. 43(b).

Now, when the contents of the server access table 3701 are as shown in FIG. 43(b), the operation of the server move management section 3703 activated by the timer 3108 will be described with reference to the flowchart of FIG. 42.

First, in step S901, the most frequently accessed server identifier 101 is determined from the server access table 3701. Next, in step S902, the virtual file identifier V__001 managed in the server computer 3101 is selected, and the real data of the real file identifier FILE__101A corresponding to that virtual identifier is moved to the other server computer 3102. When the real file identifier of the real data moved to the server computer 3102 becomes FILE__102C as a result of the move, then in step S903 the contents of the virtual file management table 3104 are updated from those shown in FIG. 37(a) to those shown in FIG. 37(b). Finally, in step S904, the server access table 3701 is initialized as shown in FIG. 43(c).

In this way, a server computer with a high frequency of access can be identified, and files can be moved effectively to distribute the workload.

In steps S901 and S902, the server move management section 3703 may select a plurality of virtual file identifiers to move the corresponding real data from a plurality of server computers. Or, there may be cases where no move operations are performed.

In the above description, the server access count updating section 3702 updates the server access table 3701 when an access request for file read occurs. Alternatively, the server access table 3701 may be updated regardless of the type of file access request or by selecting a particular type of file access request.

It is also possible to construct a virtual file management system by combining the configurations of the ninth and 10th embodiments. The system in this case includes both the file access table 3106 of FIG. 34 and the server access table 3701 of FIG. 40, and when a file access request occurs from the client computer 3112, the respective tables are updated by the file access count updating section 3107 of FIG. 34 and the server access count updating section 3702 of FIG. 40. In this configuration, since both tables are checked by the move management section when activated by the timer 3108, file move operations can be performed to achieve more effective distribution of server workload.

Next, a virtual file management system according to an 11th embodiment of the present invention will be described with reference to relevant drawings.

Figure 44:
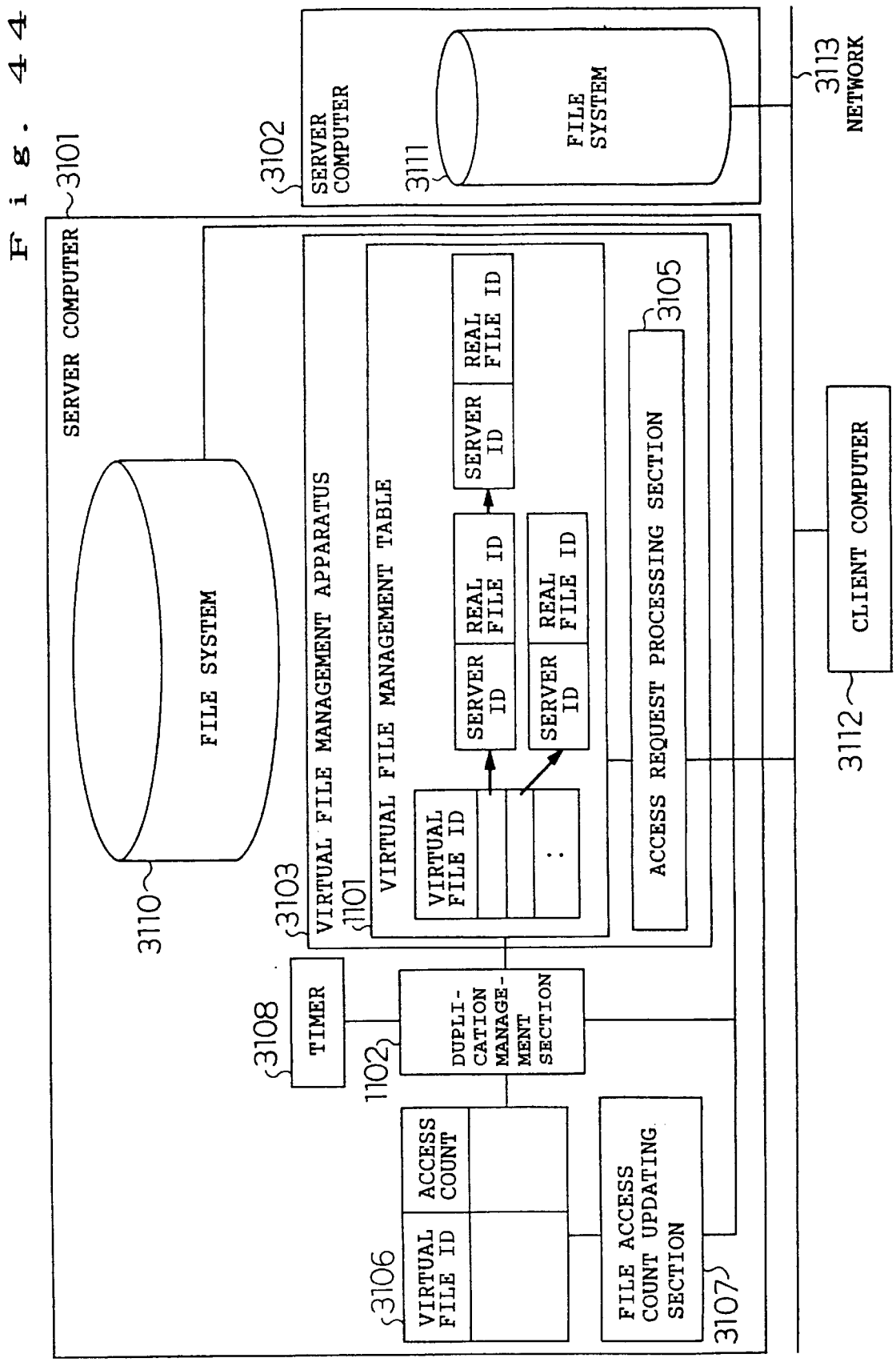
FIG. 44 is a block diagram of a virtual file management system according to an 11th embodiment of the present invention.

FIG. 44 is a block diagram showing the virtual file management system according to the 11th embodiment of the present invention. In FIG. 44, reference numeral 1101 is a virtual file management table capable of managing a plurality of server identifier/real file identifier pairs for each virtual file identifier, and 1102 is a duplication management section; the other component elements are the same as those described in connection with FIG. 34 in the description of the ninth embodiment. File duplication control means of the present invention corresponds to the duplication management section 1102, and request processing means of the present invention corresponds to the access request processing section 105.

The operation of the thus constructed virtual file management system will be described below with reference to relevant drawings.

The operation of the file access count updating section 3107 is the same as that described in connection with FIG. 35 in the description of the ninth embodiment.

Figure 45:
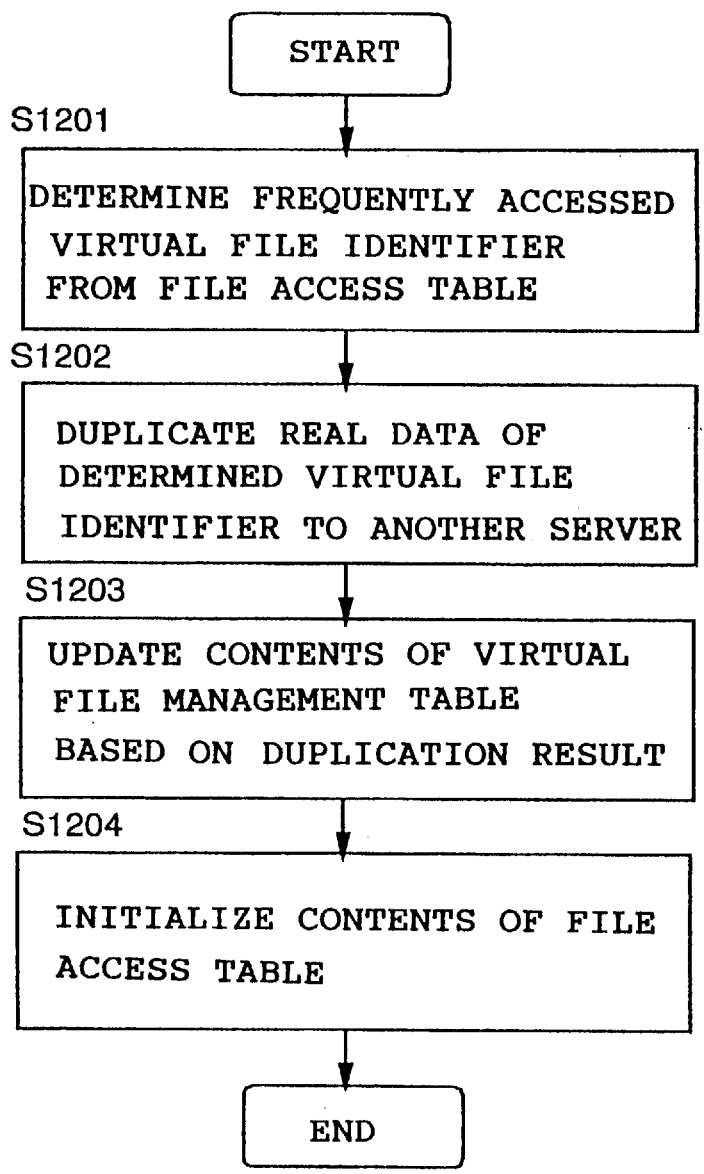
FIG. 45 is a flowchart illustrating a processing flow in a duplication management section according to the 11th embodiment.

The operation of the duplication management section 1102 activated by the timer 3108 will be described below. FIG. 45 is a flowchart illustrating the processing flow in the duplication management section 1102.

When the duplication management section 1102 is activated by the timer 3108 at a predetermined time interval, the duplication management section 1102 checks the file access table 3106 and determines a frequently accessed virtual file identifier (step S1201). Then, the real data corresponding to the thus determined virtual file identifier is duplicated to a server computer different from the server computer where the real data is stored (step S1202), and a new real file identifier/server identifier pair corresponding to that virtual identifier is added to the virtual file management table 1101 (step S1203). Finally, the file access table 3106 is initialized (step S1204).

In this way, when there occurs a file access request from the client computer 3112, the file access table 3106 is updated by the file access count updating section 3107, and the duplication management section 1102 which is activated by the timer 3108 at predetermined intervals of time checks the contents of the file access table 3106 so that the real data corresponding to the frequently accessed virtual file identifier can be duplicated to another server computer.

A specific example of how this embodiment is used will be described next.

The operation of the file access updating section 3107 is the same as that described in the ninth embodiment. The following describes the operation of the duplication management section 1102 with reference to the flowchart of FIG. 45, taking a case when the contents of the virtual file management table 1101 in the server computer 3101 are as shown in FIG. 46(a) and the contents of the file access table 3106 are as shown in FIG. 38(b).

First, in step S1201, the most frequently accessed virtual file identifier V_001 is determined from the file access table 3106. Next, in step S1202, since the real data FILE_101A corresponding to the virtual file identifier V_001 is stored in the server computer 3101, the real data corresponding to the virtual file identifier V_001 is duplicated to the server computer 3102. When the real file identifier of the duplicated real data to the server computer 3102 becomes FILE_102C, then in step S1203 the contents of the virtual file management table 1101 are updated from those shown in FIG. 46(a) to those shown in FIG. 46(b). Finally, in step S1204, the file access table 3106 is initialized as shown in FIG. 38(c).

In this way, a file with a high frequency of access is managed with multiple copies automatically created in the system.

Further, when requests for the duplicated file happen to be made from multiple client computers simultaneously, the access request processing section 3105 processes such requests not only as requests to the server where the original file is stored but also as requests to other servers where copies are stored.

Thus, by managing multiple copies of the same real data for one virtual file identifier, when file access requests are made from a client computer for the file where accesses are concentrated, the processing of the file access requests can be distributed among multiple server computers so that the system can service as many client computers as possible.

In step S1201, the duplication management section 1102 may determine two or more virtual file identifiers for creation of copies.

Further, the number of server computers to duplicate data to is not limited to one.

Further, in step S1204 illustrating the operation of the duplication management section 1102, the contents of the file access table 3106 were all initialized to 0 in the above example; alternatively, the initialization may be performed by appropriately weighting the access count of the virtual file identifier with which copies were created.

If the duplication management section 1102 of the 11th embodiment is replaced by a duplication/deletion management section, the result is the embodiment of the invention described in claim 19. In that configuration, the duplication/deletion management section incorporates not only the function of the duplication management section 1102 of the 11th embodiment, that is, the function of creating copies of real data for a frequently accessed virtual file identifier, but also the function of deleting copies of real data if multiple copies of the real data are managed in the system though its virtual file identifier is infrequently accessed. In this way, while managing multiple copies of real data for a frequently accessed virtual file identifier, if the number of accesses to that file has decreased, the copies can be deleted, thus achieving effective utilization of storage space.

As described, according to the ninth embodiment of the invention, file access frequency is managed by using the file access table and the file access count updating section, and the file access table is checked at predetermined intervals of time by using the timer and the file move management section, so that a file with a high frequency of access can be moved from one server to another. By dynamically moving files with high frequencies of access in this way, system workload can be distributed.

Further, according to the 10th embodiment of the by using the server access table and the server access count updating section, and the server access table is checked at predetermined intervals of time by using the timer and the server move management section, to find a server where accesses are concentrated. In this way, the workload of the server computer where accesses are concentrated can be distributed effectively.

Furthermore, by combining the configurations of the ninth and 10th embodiments, the effects of the invention as offered in the ninth and 10th embodiments can be achieved simultaneously.

According to the 11th embodiment of the invention, file access frequency is managed by using the file access table and the file access count updating section, the file access table is checked at predetermined intervals of time by using the timer and the duplication management section, and copies of files with high frequencies of access are stored on multiple server computers. This achieves a system that can process as many file access requests from clients as possible for a file where accesses are concentrated.

Furthermore, according to the configuration where the duplication/deletion management section is provided instead of the duplication management section of the 11th embodiment, it is made possible to delete copies of a file that was previously frequently accessed but is currently infrequently accessed. This, in addition to the effect achieved in the 11th embodiment of the invention, provides the effect of reducing wastage of storage space.

Each of the above configurations may be implemented in hardware, but it is also possible to implement equivalent functions in software.

Further, when implementing each function in software, programs implementing all or part of the software may be provided on a recording medium such as a floppy disk or a CD-ROM.

As is apparent from the above description, according to the invention, with the provision of the virtual file management apparatus operating in at least one server and comprising the management table, the request analyzing section, and the request modification processing section, a file access request from a terminal can be transferred to a server where the real data of the requested file is stored, and thus, any of the files stored on multiple servers can be accessed by just issuing an access request to one designated server from the terminal, with little increase in response time and network workload.

In the configuration of the invention in which the identifier creation section, management table processing section and control section are added to the configuration of the invention of claim 1, an access request that need not be transferred as a file access request to a server is processed by the management table processing section. This configuration, in addition to the effect achieved by the invention of claim 1, provides the effect of further reducing the network workload as well as the response time to the access request.

In the configuration of the invention in which the server selection section, file creation section, and management table updating section are added to the configuration of the invention of claim 1, a server is automatically selected when creating a new file. This configuration not only provides the same effect as achieved by the invention of claim 1 but makes it possible to create a new file to be managed by the virtual file management apparatus without having to be aware of the selection of the server where the real data of the file should be stored.

Furthermore, according to the invention, when the virtual file management apparatus operating in at least one server is constructed with the management table having an access inhibit flag, the request analyzing section, the request modification processing section, the preprocessing section, and the move processing section, a file access request from a terminal can be transferred to a server where the real data of the requested file is stored, and thus any of the files stored on multiple servers can be accessed by just issuing an access request to one designated server from the terminal, with little increase in response time and network workload. In addition, in this virtual file management system, even when the real data of a file is moved from one server to another, the terminal can access the file without having to be aware of where the file is moved.

Also, according to the invention, when the virtual file management apparatus operating in at least one server is constructed with the management table, the request analyzing section, the request modification processing section, and the operating condition management table, a file access request from a terminal can be transferred to a server where the real data of the requested file is stored, and thus any of the files stored on multiple servers can be accessed by just issuing an access request to one designated server from the terminal, with little increase in response time and network workload. In addition to that, when the server where the real data of the file is stored is not operating, the non-operating condition can be reported to the terminal.

In the configuration of the invention in which the file identifier list, access request monitoring section, transmitting section, and request processing section are provided in each of multiple servers, when a file access request is made to a virtual server from a terminal, the real server where the requested file is managed can by itself respond to the requesting terminal, and thus any of the files stored on the multiple servers can be accessed by just issuing an access request to one virtual server from the terminal, without causing workload concentration on a particular server and without increasing network workload.

Further, in the configuration of the invention in which the master file identifier list, identifier creation section, server selection section, file creation section, master list updating section, and list updating section are added to the configuration of the invention of claim 7, a server is automatically selected when creating a new file. This configuration not only provides the same effect as achieved by the invention of claim 7 but makes it possible to create a new file without having to be aware of the selection of the server where the real data of the file should be stored.

As described above, the present invention has the advantage of improving responsiveness to the terminal and reducing the workload of the network.

Furthermore, by including the request frequency storage means for storing the frequencies of the requests made from terminals within a prescribed period of time for each managed file and/or for each managed server, and the file move control means for selecting a file satisfying a prescribed criterion by using the stored request frequencies and for moving the selected file from the server where it is stored to another server, the invention provides the advantage of further improving the processing capabilities to process file requests from the terminals, as compared with the prior art configuration.

What is claimed is:

1. A virtual file management system constructed with a plurality of servers and a plurality of terminals that share file services provided by said servers, wherein a virtual file management apparatus operating in at least one of said plurality of servers is provided that comprises: a management table which manages files stored on said plurality of servers by using virtual file identifiers, and in which a server name of a server where real data is stored and a real file identifier in said server are stored as a set for each of said virtual file identifiers; a receiving section which receives a file access request from each of said terminals; a request analyzing section which checks said management table by using the virtual file identifier contained in the file access request received by said receiving section, and thereby determines the server where the real data of the requested file is stored; a transmitting section which transmits data; and a request modification processing section which modifies said file access request so that a response to said file access request can be sent back to the terminal that issued said access request, directly from the server determined by said request analyzing section, and which instructs said transmitting section to transmit said modified file access request to said determined server, and said plurality of servers each include a request processing section which receives the file access request transmitted from said transmitting section of said virtual file management apparatus, and processes said received file access request, and which transmits the processed result to said terminal at least when said file access request is a request to read file contents.

2. A virtual file management system according to claim 1, wherein said management table further stores an attribute of said files, and said virtual file management apparatus further comprises: a management table processing section which processes a file access request made from each of said terminals to update or reference said management table, creates response data from a processed result, and instructs said transmitting section to transmit said created response data to said terminal; and a control section which identifies the type of the file access request received by said receiving section, and which passes said file access request in a selective manner to said management table processing section when said file access request is identified as a request to update or reference said management table, and to said request analyzing section when said file access request is identified as a request other than the request to update or reference said management table.

3. A virtual file management system according to claim 1, wherein said virtual file management apparatus further comprises: an identifier creation section which, when creating a new file in any one of said plurality of servers, creates for said file a new virtual file identifier not yet existing in said management table; a server selection section which selects a server where real data of said file is to be stored; a file creation section which acquires a real file identifier corresponding to said new virtual file identifier from the server selected by said server selection section; and a management table updating section which updates said management table by storing said new virtual file identifier, the server name of said server selected by said server selection section, and said real file identifier as a set in said management table.

4. A virtual file management system constructed with a plurality of servers and a plurality of terminals that share file services provided by said servers, wherein a virtual file management apparatus operating in at least one of said plurality of servers is provided that comprises: a management table which manages files stored on said plurality of servers by using virtual file identifiers, and in which a server name of a server where real data is stored, a real file identifier in said server, and an access inhibit flag are stored as a set for each of said virtual file identifiers; a receiving section which receives a file access request from each of said terminals; a request analyzing section which checks said management table by using the virtual file identifier contained in the file access request, and thereby determines the server where the real data of the requested file is stored; a transmitting section which transmits data; a request modification processing section which modifies said file access request so that a response to said file access request can be sent back to the terminal that issued said access request, directly from the server determined by said request analyzing section, and which instructs said transmitting section to transmit said modified file access request to said determined server; and a preprocessing section which checks said management table in connection with the file requested in the file access request received by said receiving section, and which, when said access inhibit flag is set, instructs said transmitting section to transmit data indicating an access inhibited condition to said terminal, but when said access inhibit flag is not set, passes said file access request to said request analyzing section, and said plurality of servers each include a request processing section which receives the file access request transmitted from said transmitting section of said virtual file management apparatus, processes said received file access request, and transmits the processed result to said terminal.

5. A virtual file management system according to claim 4, wherein said virtual file management apparatus further comprises a file move processing section which, when moving real data of a particular file from one server to another server, sets said access inhibit flag in said management table and duplicates the real data of said particular file from the source server to the destination server, and which clears said access inhibit flag after updating said management table by changing said server name of the server where the real data of said particular file is stored and said real file identifier in said server to the server name of the destination server and the real file identifier in said destination server.

6. A virtual file management system constructed with a plurality of servers and a plurality of terminals that share file services provided by said servers, wherein a virtual file management apparatus operating in at least one of said plurality of servers is provided that comprises: a management table which manages files stored on said plurality of servers by using virtual file identifiers, and in which a server name of a server where real data is stored and a real file identifier in said server are stored as a set for each of said virtual file identifiers; an operating condition management table which manages data indicating whether said server is operating or not; a receiving section which receives a file access request from each of said terminals; a request analyzing section which checks said management table by using the virtual file identifier contained in the file access request received by said receiving section, and thereby determines the server where the real data of the requested file is stored; a transmitting section which transmits data; and a request modification processing section which checks said operating condition management table to determine whether said server determined by said request analyzing section is operating or not, and which, when said server is not operating, instructs said transmitting section to transmit data indicating a non-operating condition to said terminal, but when said server is operating, modifies said file access request so that a response to said file access request can be sent back to the terminal that issued said access request, directly from the server determined by said request analyzing section, and instructs said transmitting section to transmit said modified file access request to said determined server, and said plurality of servers each include a request processing section which receives the file access request transmitted from said transmitting section of said virtual file management apparatus, processes said received file access request, and transmits a processed result to said terminal.

7. A virtual file management system constructed with a plurality of servers and a plurality of terminals that share file services provided by said servers, and capable of supporting a configuration in which file access requests from said terminals are issued to a virtual server that is different from said plurality of servers and that does not exist physically, wherein said plurality of servers each include: a file identifier list which manages file identifiers stored in each server; a transmitting section which transmits data; a request processing section which processes a file access request and instructs said transmitting section to transmit the processed result to said terminals; and an access request monitoring section which monitors a file access request being made from said terminals to said virtual server, and which passes said file access request to said request processing section only when the file identifier contained in said file access request is stored in said file identifier list.

8. A virtual file management system according to claim 7, capable of supporting the creation of a new file, wherein one of said plurality of servers includes: a master file identifier list which manages the file identifiers of files stored on said plurality of servers; an identifier creation section which creates a new file identifier not yet existing in said master file identifier list; a server selection section which selects a server where real data of said file is to be stored; a file creation section which instructs the server selected by said server selection section to create said file with said file identifier created by said identifier creation section; and a master list updating section which adds said file identifier to said master file identifier list, said access request monitoring section is also capable of monitoring a file creation request, and each of said plurality of servers further includes a list updating section which updates said file identifiers stored in each server in compliance with an instruction from said file creation section.

9. A virtual file management system comprising a plurality of servers, a plurality of terminals that share file services provided by said servers, and at least one virtual file management apparatus, wherein said at least one virtual file management apparatus comprises: a management table which manages files stored on said plurality of servers by using virtual file identifiers, and in which a server name of a server where real data is stored and a real file identifier in said server are stored as a set for each of said virtual file identifiers; a receiving section which receives a file access request from each of said terminals; a request analyzing section which checks said management table by using the virtual file identifier contained in the file access request received by said receiving section, and thereby determines the server where the real data of the requested file is stored; a transmitting section which transmits data; and a request modification processing section which modifies said file access request so that a response to said file access request can be sent back to the terminal that issued said access request, directly from the server determined by said request analyzing section, and which instructs said transmitting section to transmit said modified file access request to said determined server, and said plurality of servers each include a request processing section which receives the file access request transmitted from said transmitting section of said virtual file management apparatus, and processes said received file access request, and which transmits the processed result to said terminal at least when said file access request is a request to read file contents.

10. A virtual file management system comprising a plurality of servers for storing files, a plurality of terminals for issuing requests for supply of designated files from among said files, and a network connecting said servers with said terminals, wherein at least one of said servers includes: file management means for managing corresponding relationships between the files stored on said plurality of servers and the servers where the files are stored; request frequency storage means for storing the frequencies of the requests made from said terminals within a prescribed period of time for each managed file and/or for each managed server; and file move control means for selecting a file satisfying a prescribed criterion from among said managed files by using said stored request frequencies, and for moving said selected file from the server where said file is stored to another server.

11. A virtual file management system according to claim 10, wherein when said request frequency storage means stores said frequencies for each file, selecting a file satisfying a prescribed criterion by using said stored request frequencies means checking said stored request frequencies and selecting a file with the highest request frequency.

12. A virtual file management system according to claim 10, wherein when said request frequency storage means stores said frequencies for each server, selecting a file satisfying a prescribed criterion by using said stored request frequencies means checking said stored request frequencies and selecting a file stored in a server with the highest request frequency.

13. A virtual file management system according to claim 10, wherein when said request frequency storage means stores said frequencies for each file and for each server, selecting a file satisfying a prescribed criterion by using said stored request frequencies means selecting a server with the highest request frequency from among said plurality of servers and then selecting a file with the highest frequency from among the files stored on said selected server.

14. A virtual file management system comprising a plurality of servers for storing files, a plurality of terminals for issuing requests for supply of designated files from among said files, and a network connecting said servers with said terminals, wherein at least one of said servers includes: file management means for managing corresponding relationships between the files stored on said plurality of servers and the servers where the files are stored; request frequency storage means for storing the frequencies of the requests made from said terminals within a prescribed period of time for each managed file and/or for each managed server; file duplication control means for selecting a file satisfying a prescribed criterion from among said managed files by using said stored request frequencies, and for duplicating said selected file to a server different from the server where said file is stored; and request processing means for, when said requests occur simultaneously for said duplicated file, processing said requests by also including said different server as a target.

15. A virtual file management system according to claim 14, wherein when said request frequency storage means stores said frequencies for each file, selecting a file satisfying a prescribed criterion by using said stored request frequencies means checking said stored request frequencies and selecting a file with the highest request frequency.

16. A virtual file management system according to claim 14, wherein when said request frequency storage means stores said frequencies for each server, selecting a file satisfying a prescribed criterion by using said stored request frequencies means checking said stored request frequencies and selecting a file stored in a server with the highest request frequency.

17. A virtual file management system according to claim 14, wherein when said request frequency storage means stores said frequencies for each file and for each server, selecting a file satisfying a prescribed criterion by using said stored request frequencies means selecting a server with the highest request frequency from among said plurality of servers and then selecting a file with the highest frequency from among the files stored on said selected server.

18. A virtual file management system constructed with a plurality of servers and a plurality of terminals that share file services provided by said servers, wherein at least one of said plurality of servers includes a virtual file management apparatus which centrally manages files stored on said plurality of servers by using a virtual file management table in which a virtual file identifier, a server identifier of each of said servers, and a real file identifier of each of said files are stored as a set, and said system comprises: a file access table in which an access count is stored for each of said virtual file identifiers; a file access count updating section which, when said virtual file management apparatus has received a file access request for a virtual file identifier from any one of said terminals, updates the access count corresponding to said virtual file identifier in said file access table; a timer; and a file move management section which is activated by said timer at predetermined intervals of time, and which checks the access counts in said file access table, moves real data corresponding to one or more virtual file identifiers between said plurality of servers, updates said virtual file management table, and resets said file access table.

19. A virtual file management system constructed with a plurality of servers and a plurality of terminals that share file services provided by said servers, wherein at least one of said plurality of servers includes a virtual file management apparatus which centrally manages files stored on said plurality of servers by using a virtual file management table in which a virtual file identifier, a server identifier of each of said servers, and a real file identifier of each of said files are stored as a set, and said system comprises: a server access table in which an access count is stored for each of said server identifiers; a server access count updating section which, when said virtual file management apparatus has received a file access request for a virtual file identifier from any one of said terminals, locates the server identifier corresponding to said virtual file identifier in said virtual file management table, and updates the access count corresponding to said server identifier in said server access table; a timer; and a server move management section which is activated by said timer at predetermined intervals of time, and which checks the access counts in said server access table, moves real data corresponding to one or more virtual file identifiers between said plurality of servers, updates said virtual file management table, and resets said server access table.

20. A virtual file management system constructed with a plurality of servers and a plurality of terminals that share file services provided by said servers, wherein at least one of said plurality of servers includes a virtual file management apparatus which centrally manages files stored on said plurality of servers by using a virtual file management table in which a virtual file identifier, a server identifier of each of said servers, and a real file identifier of each of said files are stored as a set, and said system comprises: a file access table in which an access count is stored for each of said virtual file identifiers; a server access table in which an access count is stored for each of said server identifiers; an access count updating section which, when said virtual file management apparatus has received a file access request for a virtual file identifier from any one of said terminals, locates the server identifier corresponding to said virtual file identifier in said virtual file management table, and updates the access count corresponding to said virtual file identifier in said file access table as well as the access count corresponding to said server identifier in said server access table; a timer; and a move management section which is activated by said timer at predetermined intervals of time, and which checks the access counts in said server access table as well as in said file access table, moves real data corresponding to one or more virtual file identifiers between said plurality of servers, updates said virtual file management table, and resets said file access table and said server access table.

21. A virtual file management system constructed with a plurality of servers and a plurality of terminals that share file services provided by said servers, wherein at least one of said plurality of servers includes a virtual file management apparatus which centrally manages files stored on said plurality of servers by using a virtual file management table in which a plurality of identifier pairs, each consisting of a server identifier of each of said servers and a real file identifier of each of said files, are stored in corresponding relationship to each virtual file identifier, and said system comprises: a file access table in which an access count is stored for each of said virtual file identifiers; a file access count updating section which, when said virtual file management apparatus has received a file access request for a virtual file identifier from any one of said terminals, updates the access count corresponding to said virtual file identifier in said file access table; a timer; and a duplication management section which is activated by said timer at predetermined intervals of time, and which checks the access counts in said file access table, duplicates real data corresponding to a frequently accessed virtual file identifier to one or more servers selected from among said plurality of servers, adds the real file identifier and server identifier of the duplicated data to said virtual file management table, and resets said file access table.

22. A virtual file management system constructed with a plurality of servers and a plurality of terminals that share file services provided by said servers, wherein at least one of said plurality of servers includes a virtual file management apparatus which centrally manages files stored on said plurality of servers by using a virtual file management table in which a plurality of identifier pairs, each consisting of a server identifier of each of said servers and a real file identifier of each of said files, are stored in corresponding relationship to each virtual file identifier, and said system comprises: a file access table in which an access count is stored for each of said virtual file identifiers; a file access count updating section which, when said virtual file management apparatus has received a file access request for a virtual file identifier from any one of said terminals, updates the access count corresponding to said virtual file identifier in said file access table; a timer; and a duplication/deletion management section which is activated by said timer at predetermined intervals of time, and which checks the access counts in said file access table, duplicates real data corresponding to a frequently accessed virtual file identifier to one or more servers selected from among said plurality of servers, deleting all but one or more server identifier/real file identifier pairs from said virtual file management table for an infrequently accessed virtual file identifier, updates said virtual file management table, and resets said file access table.

23. A medium for use with a virtual file management system constructed with a plurality of servers and a plurality of terminals that share file services provided by said servers, said medium providing a program recorded thereon for implementing: a function A that manages files stored on said plurality of servers by using virtual file identifiers and that stores a server name of a server where real data is stored and a real file identifier in said server as a set in a management table for each of said virtual file identifiers; a function B that receives a file access request from each of said terminals; a function C that checks said management table by using the virtual file identifier contained in said received file access request, and thereby determines the server where the real data of the requested file is stored; a function D that modifies said file access request so that a response to said file access request can be sent back to the terminal that issued said access request, directly from said determined server, and that instructs a transmitting section to transmit said modified file access request to said determined server; and a function E that receives the file access request transmitted from said transmitting section and processes said received file access request, and that transmits the processed result to said terminal at least when said file access request is a request to read file contents.

24. A medium providing a program recorded thereon for implementing the functions of all or part of the means of the virtual file management system as described in any one of claims 1 to 22.

* * * * *